United States Patent
King et al.

(10) Patent No.: US 6,973,412 B2
(45) Date of Patent: Dec. 6, 2005

(54) METHOD AND APPARATUS INVOLVING A HIERARCHY OF FIELD REPLACEABLE UNITS CONTAINING STORED DATA

(75) Inventors: James E. King, Wokingham (GB);
Martin P. Mayhead, Hindhead (GB);
Brian J. Gillespie, Dublin (IE)

(73) Assignee: Sun Microsystems, Inc., Santa Clara, CA (US)

( * ) Notice: Subject to any disclaimer, the term of this patent is extended or adjusted under 35 U.S.C. 154(b) by 295 days.

(21) Appl. No.: 10/365,805

(22) Filed: Feb. 13, 2003

(65) Prior Publication Data

US 2004/0162945 A1    Aug. 19, 2004

(51) Int. Cl.[7] .......................... G06F 11/30; G06F 12/00
(52) U.S. Cl. ....................................... 702/182; 711/122
(58) Field of Search ...................... 702/182; 711/122, 711/117, 133

(56) References Cited

U.S. PATENT DOCUMENTS

| | | | |
|---|---|---|---|
| 5,293,556 A * | 3/1994 | Hill et al. ............... | 702/184 |
| 5,404,503 A * | 4/1995 | Hill et al. ............... | 714/31 |
| 5,619,158 A * | 4/1997 | Casal et al. ............. | 327/292 |
| 6,262,493 B1 * | 7/2001 | Garnett .................... | 307/64 |
| 6,587,963 B1 * | 7/2003 | Floyd et al. .............. | 714/25 |
| 6,684,180 B2 * | 1/2004 | Edwards et al. .......... | 702/184 |
| 6,718,472 B1 * | 4/2004 | Garnett .................... | 713/300 |
| 6,909,992 B2 * | 6/2005 | Ashley .................... | 702/184 |
| 2002/0023181 A1 * | 2/2002 | Brown et al. ............. | 710/8 |
| 2003/0217247 A1 * | 11/2003 | Abramovitz et al. ...... | 711/173 |
| 2004/0153686 A1 * | 8/2004 | Gilstrap et al. ........... | 714/1 |

FOREIGN PATENT DOCUMENTS

| | | |
|---|---|---|
| EP | 0413512 | 8/1990 |
| GB | 2329044 | 3/1999 |
| WO | 92/14207 | 8/1992 |

OTHER PUBLICATIONS

Sun Microsystems, Sun Netra SNMP management Agent 1.4, Oct. 2002.*
International search report application number GB0400111.1 mailed Mar. 3, 2004.
"Sun Netra SNMP Management Agent 1.4", Sun Microsystems, Inc., Palo Alto, CA, Oct. 2002, p. 3, 4, 15 and 16, http://www.sun.com/products-n-solutions/hw/networking/solutions/pdfs.

* cited by examiner

*Primary Examiner*—Bryan Bui
*Assistant Examiner*—Toan M. Le
(74) *Attorney, Agent, or Firm*—Meyertons Hood Kivlin Kowert & Goetzel, P.C.; R. Noël Kivlin

(57) ABSTRACT

Apparatus representing a computer system or such-like is disclosed that includes a hierarchy of field replaceable units (FRUs). Each FRU in the hierarchy has a type, and may have a number of subsidiary FRUs. A FRU stores data indicative of at least the number and type of any subsidiary FRUs that may be immediately below it in the hierarchy, as well as data concerning the identity of the FRU itself. The apparatus has a utility to allow access and consolidation at a single location of all the FRU data stored in the hierarchy. In one embodiment, this utility is provided in the form of a configuration application running on a service processor of the apparatus.

47 Claims, 12 Drawing Sheets

METHOD AND APPARATUS INVOLVING A HIERARCHY OF FIELD REPLACEABLE UNITS CONTAINING STORED DATA

FIELD OF THE INVENTION

The present invention relates to computer systems and such-like that contain field replaceable units (FRUs) arranged into a hierarchy, in which a FRU in the hierarchy may have a number of subsidiary FRUs.

BACKGROUND OF THE INVENTION

Modern computer systems are often provided with two or more of a given hardware component (processing unit, storage subsystem, etc.) in order to increase the overall capacity of the installation. Furthermore, such duplication provides redundancy or fault tolerance against failure of one of the components.

In one approach (known as active-active), a pair of identical (or similar) components are operated concurrently with one another. Should a failure occur in one of the pair, the system will then continue operating using the other component in the pair, albeit at reduced capacity. Alternatively, in an approach known as active-standby, one of the pair is maintained off-line as a backup that is available to be brought on-line, should the active component develop a fault. In the absence of a fault to the active component however, the back-up is generally maintained in a non-operational state.

The ongoing maintenance of modern computer systems can be an extremely demanding task. Typically various hardware and software components may need to be upgraded and/or replaced, and general system administration tasks must also be performed, for example to accommodate new uses or users of the system. There is also a need to be able to detect and diagnose faulty behaviour, which may originate with either a software or hardware problem.

Hardware maintenance of a computer system is usually accomplished by visiting engineers. A typical service task to be performed is where a particular unit within the system has failed. Many systems are specifically designed to include various field-replaceable units (FRUs), such as a power supply, a disk drive, and so on, which can be replaced if necessary by a visiting service engineer or technician.

In some systems, information that is useful for diagnostic purposes is maintained in each FRU. This information may contain details about when and where the FRU was manufactured, thereby potentially enabling the subsequent identification of a fault in a manufacturing line (e.g. if FRUs from a particular batch are found to experience an unusually high failure rate). In addition, the FRU can also maintain a record of its operational history, including information such as error rate, maximum temperature, and so on. This data can then be used for various purposes. For example, knowledge of the error rate information can be helpful in determining whether a given observed error represents a one-off occurrence, perhaps due to an external event (for example, a power surge following a lightning strike, or a cosmic ray hit), or whether it is occurring on a repetitive basis, thereby indicating that there is probably some intrinsic fault within the device itself. Knowledge of the maximum temperature can be useful for ensuring that the device has not gone outside the correct operational range. Thus if the unit has been subject to excessive temperatures, this may provide a likely cause for any observed errors or malfunctions (and may also have warranty implications).

An important aspect of any remedial service operation is fault isolation, namely to identify the precise location of any fault that may be giving rise to observed errors. In a complex system such fault isolation can be a difficult and time-consuming task, but this can be considerably assisted by having access to the FRU diagnostic information described above. Unfortunately however, interfacing with each FRU to obtain this information is a laborious task. Moreover, it may take significant effort just to determine which FRUs are actually present in a given system, since these are often configured in a rather complex, hierarchical arrangement.

SUMMARY OF THE INVENTION

Thus in accordance with one embodiment of the invention there is provided apparatus that includes a hierarchy of field replaceable units (FRUs). Each FRU in the hierarchy may have a number of subsidiary FRUs, each of a particular type. A FRU includes stored FRU identity data, relating to or describing the FRU itself, and subsidiary FRU data that is indicative of at least the number and type of any subsidiary FRUs that may be immediately below the in the hierarchy. The apparatus is operable to provide a consolidated version of the FRU identity data and subsidiary FRU data stored by the various FRUs in the hierarchy.

The ability to access a consolidated version of the stored FRU information provides a convenient and useful tool for investigating the apparatus. For example, this may be used for inventory management purposes, in order to maintain a record of which FRUs are located in which apparatus or system. It may also be helpful for diagnostic purposes, to allow a service engineer to readily determine the structure of the FRU hierarchy. For example, it may be that certain FRUs are incompatible with one another, and should not be installed together in the same system. Likewise, if a particular error is observed in the apparatus, ready access to a description of the FRU hierarchy or tree may help to be able to isolate the fault (e.g. a particular type of FRU may have a known susceptibility for causing the observed error). Furthermore, if the apparatus is part of a cluster, knowledge of the FRU hierarchy can be helpful for workload allocation across the cluster, since certain tasks may require the presence in the apparatus of particular components, such as memory of a set minimum capacity. In such an environment, the workload controller for the cluster can then ensure that tasks are assigned to systems or components that have the requisite facilities.

To support such activities, the apparatus typically includes an external interface from which the consolidated version of the FRU data can be accessed (by a service engineer, a workload controller, and so on). This interface may represent a local console attached to the apparatus, a software link to support remote monitoring and diagnosis, or any other appropriate facility.

An important consideration is that it is not possible to initially provide an apparatus at manufacture with a complete and unchanging set of FRU information, since the components in the apparatus are (by definition) replaceable. Furthermore, there may be additional developments after completion of the apparatus that may have the effect of extending the hierarchy. Thus the apparatus may support a particular type of FRU that initially does not include any subsidiary FRUs, but a subsequent version of this same type of FRU may support one or more subsidiary FRUs. This possibility is accommodated by having each FRU generally contain information regarding the immediate lower level in the hierarchy. The consolidated version of the subsidiary FRU data for the entire hierarchy can then be generated by iteratively examining the subsidiary FRU data for each level in the hierarchy in turn.

In one particular embodiment, FRU data is stored into a FRU at manufacture, typically in a read only memory (ROM), and lists the maximum number of each type of FRU that may be located immediately below the FRU in the hierarchy. Thus, for each type of slot or interface included in the FRU that can receive a subsidiary FRU, the subsidiary FRU data typically lists the number of slots or interfaces of that type. For example, the subsidiary FRU data may indicate that a FRU contains two PCI slots, and 4 dual in-line memory module (DIMM) slots. It will be appreciated that this data is part of the hardware architecture of the FRU, and so is indeed known at manufacture of the FRU.

The FRU identity data typically comprises a part ID for the FRU, but may be more limited. For example, it may just reflect the type of slot into which FRU connects, which should of course then match the slot or interface detailed in the subsidiary FRU data for the next FRU up in the hierarchy. At its simplest, the FRU identity data may do no more than serve to confirm that this FRU is indeed installed into the system (in other words that the particular slot is not vacant). It will be appreciated that in this case, the FRU identity data need not be stored as such, but the FRU may just support some mechanism to acknowledge its presence when installed.

On the other hand, the FRU identity data may be fairly extensive, for example including statistics about the FRU, such as part number, capacity, speed, etc., as well as possibly some history information, such as past error rate. This additional information may be useful in selected circumstances. For example, if the consolidated version of the FRU data is to be used for inventory management, then knowledge of past error rate is not generally needed. However, this data may be important if the consolidated version of the FRU data is being obtained in order to help diagnose a particular fault.

The are a variety of mechanisms whereby the consolidated version of the FRU data can be generated. In one approach, the FRU data is acquired under the control of a utility program, which may typically comprise a set-up or configuration program running on a service processor or such-like within the apparatus. Thus the utility program starts at the top of the FRU hierarchy, and sends a request to obtain the relevant FRU identity data and subsidiary FRU data. From this, it determines the FRUs in the next lower level of the hierarchy, and contacts them to obtain their FRU identity data and subsidiary FRU data. This process is repeated for each level of the hierarchy until the bottom of the hierarchy is reached, whereupon the utility has obtained FRU data for the whole system.

(Note that the component at the top of the FRU hierarchy is not necessarily a FRU itself, in the sense of being replaceable in the field. For example, it may represent a fixed framework or such-like into which the lower levels of the FRU hierarchy can be accommodated. Nevertheless, this top-level component will normally have identity data and associated subsidiary FRU information, indicative of the number and type of FRUs that it can accommodate).

In a somewhat different approach, each FRU is responsible for consolidating the FRU data for all the FRUs below it. Thus an initial request to generate a consolidated set of FRU data may be generated by the utility, and passed as before to the top of the FRU hierarchy. However, rather than the top of the FRU hierarchy directly responding with its own FRU data, instead it uses its subsidiary FRU data to percolate the request down towards the bottom of the hierarchy. In other words, each FRU in the hierarchy forwards the request to its subsidiary FRUs, as specified by its subsidiary FRU data. Once the request has reached the bottom of the hierarchy, the responses (containing the FRU identity data and FRU subsidiary data) are now passed back up towards the top of the tree, with each FRU consolidating the responses for all of its subsidiary FRUs. Ultimately therefore, the top level component in the FRU is able to respond to the initial request from the utility by providing it with a consolidated version of the FRU data for the complete hierarchy.

Note that the decision as to whether to employ a top-down approach for FRU data consolidation (i.e. driven by the utility sending requests to all levels), or a more distributed approach (where each level consolidates FRU data from the lower levels) is determined by hardware and software details of the particular implementation. Thus factors of relevance may be whether or not the utility is able to send a request directly to all FRUs in the hierarchy, and whether or not a particular FRU has enough processing power to be able to perform a consolidation of information from lower levels. It will be appreciated that these two approaches are not mutually exclusive, in that both can be employed in the same system. In other words, some of the FRU hierarchy can be investigated using the top-down approach, while others can be investigated using the distributed approach.

In one embodiment, the subsidiary FRU data for a FRU is updateable to indicate the number and type of any subsidiary FRUs that are installed immediately below the FRU in the hierarchy in a current configuration of the apparatus. In other words, the subsidiary FRU data then not only indicates the number and type of FRUs that might be installed, but also those that actually are installed. For example, in the above situation of a FRU having 2 PCI slots and 4 DIMM slots, the subsidiary FRU data might indicate that one of the PCI slots and two of the DIMM slots are currently occupied. It will be appreciated that in these circumstances the subsidiary FRU data must be stored in a component that is at least partly writeable, for example an electrically erasable programmable read only memory (EEPROM). This then allows the relevant subsidiary FRU data to be updated if the FRU configuration is altered (e.g. if the PCI card is removed, or two extra DIMMs added).

In one embodiment, a utility generates a new consolidated version of the FRU data stored in the hierarchy in response to a change in configuration of the apparatus. Thus if the hardware detects removal or insertion of a FRU, this leads to an update of the consolidated FRU information. Note that in the latter situation (insertion of a FRU), this will involve acquiring the FRU identity data and subsidiary FRU data for the newly inserted FRU. Furthermore, the newly inserted FRU may itself potentially (or actually) incorporate one or more FRUs, thereby representing an extension of the FRU hierarchy, and this also needs to be investigated. Such an investigation may be performed either under the control of the receiving FRU or by some set-up utility, as previously described.

In accordance with another embodiment of the invention, a field replaceable unit (FRU) is provided for installation into an apparatus comprising a hierarchy of FRUs. A FRU in the hierarchy may have a number of subsidiary FRUs of various types. The FRU has stored subsidiary FRU data indicative of the number and type of any subsidiary FRUs that are installable immediately below it in the hierarchy.

In accordance with another embodiment of the invention, there is provided a method of manufacturing a field replaceable unit (FRU) for installation into an apparatus that comprises a hierarchy of FRUs. A FRU in the hierarchy may have a number of subsidiary FRUs of one or more types. The method comprises generating subsidiary FRU data indicative of the number and type of any subsidiary FRUs that are installable immediately below the FRU in the hierarchy, and storing the subsidiary FRU data into a read only memory (ROM) within the FRU.

In accordance with another embodiment of the invention, there is provided a method of operating apparatus that includes a hierarchy of field replaceable units (FRUs), wherein a FRU in the hierarchy may have a number of subsidiary FRUs of various types. The method involves providing, within a FRU, FRU identity data relating to the FRU itself, as well as subsidiary FRU data that indicates the number and type of any subsidiary FRUs that may be immediately below the FRU in the hierarchy. The method further involves generating a consolidated version of the FRU identity data and subsidiary FRU data stored by the various FRUs in the hierarchy.

In accordance with another embodiment of the invention, there is provided a computer program product comprising program instructions in machine readable form on a media. The instructions are loadable into apparatus having a hierarchy of field replaceable units (FRUs), in which a FRU in the hierarchy may have a number of subsidiary FRUs of one or more types. Each FRU has stored FRU identity data descriptive of itself, and subsidiary FRU data indicative of at least the number and type of any subsidiary FRUs that may be immediately below this FRU in the hierarchy. The instructions cause the following method to be performed within the apparatus, for each level of the hierarchy. Firstly, a request is transmitted for the FRU identity data and subsidiary FRU data for each FRU in that level of the hierarchy; and then, in response to this request, the FRU identity data and subsidiary FRU data for each FRU in that level is received back. It is then determined from the received subsidiary data whether there are any subsidiary FRUs in the next lower level of the hierarchy. These steps are repeated iteratively until all the FRU identity data and subsidiary FRU data stored in the hierarchy has been received. This then allows a consolidated version of the received FRU data to be generated.

Such program instructions are typically stored on a hard disk of a computer system, and loaded for use into random access memory (RAM) for execution by a system processor. Note that rather than being stored on the hard disk or other form of fixed storage, part or all of the program instructions may also be stored on a removable storage medium, such as an optical (CD ROM, DVD, etc) or magnetic (floppy disk, tape, etc) device. Alternatively, the program instructions may be downloaded via a transmission signal medium over a network, for example, a local area network (LAN), the Internet, and so on. In one particular embodiment, the program instructions are executed on a service processor of the apparatus.

It will be appreciated that the method and computer program product embodiments of the invention will generally benefit from the same particular features as the apparatus embodiments of the invention.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 1:
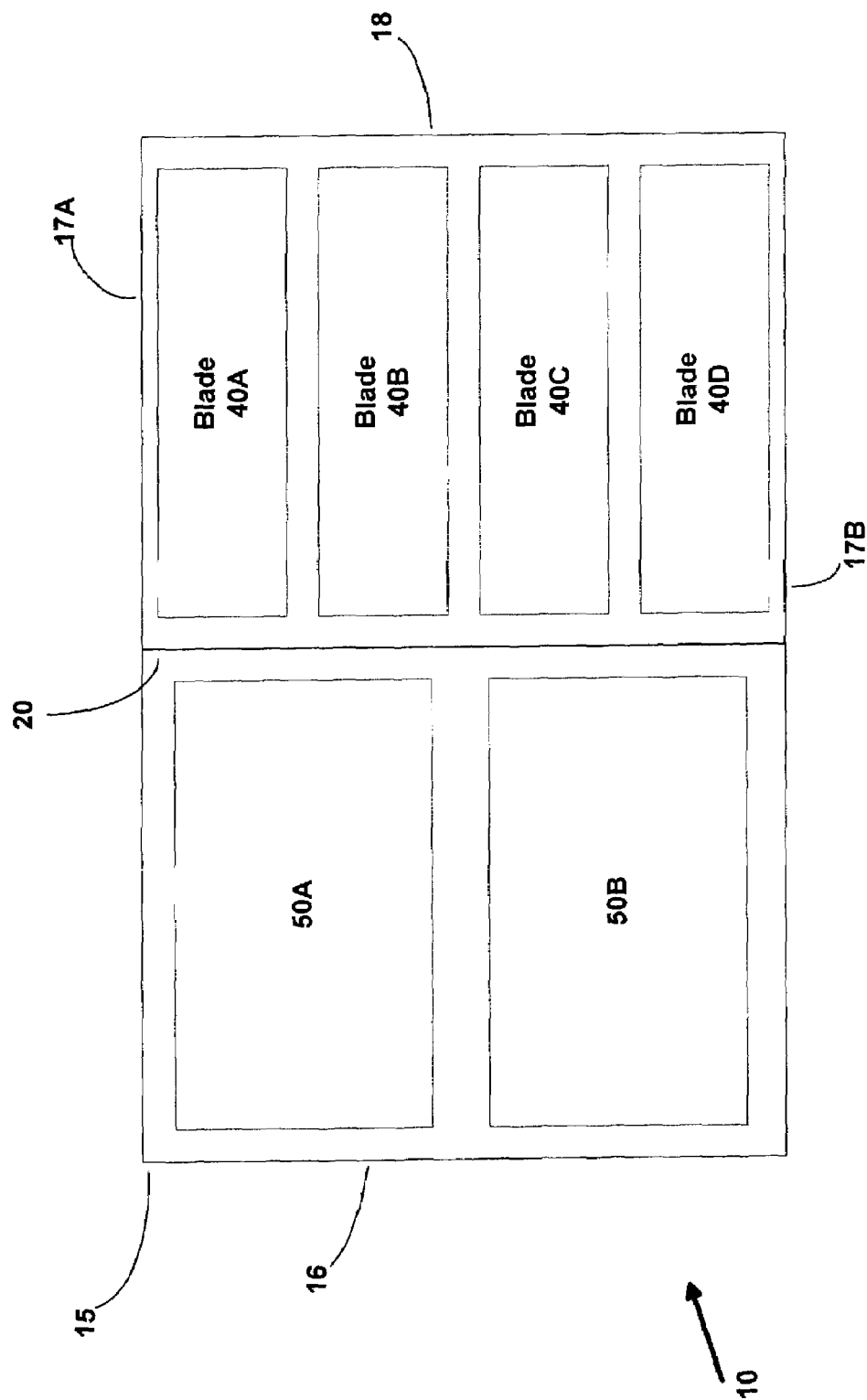
FIG. 1 is a schematic plan view of a shelf of a rack-mounted computer system in accordance with one embodiment of the invention.

FIG. 1 illustrates a computer system 10 in accordance with one embodiment of the invention. System 10 is a rack-mounted server system, and FIG. 1 depicts a plan view of the contents of one shelf (it will be appreciated that system 10 may incorporate additional shelves).

As shown in FIG. 1, computer system 10 includes a frame or chassis 15, which incorporates a mid-plane 20. The mid-plane 20 provides a set of connections between components in the front portion of the chassis and those in the rear portion of the chassis. (For orientation purposes, the front wall of the chassis is denoted in FIG. 1 by the reference numeral 18, and the rear wall by the reference numeral 16, with the side walls being marked as 17A and 17B).

The front portion of the chassis is occupied by four processing units known as blades, 40A, 40B, 40C and 40D, which provide the primary processing power of system 10. For clarity, FIG. 1 shows only four blades, but in one particular embodiment a shelf can accommodate up to 16 blades. It will be appreciated that in any given system, one or more blade unit slots may be empty, depending upon the particular computing requirements for that installation.

Each of the blade units 40 is generally similar, although there may be certain differences between them, for example in relation to the amount of memory provided on a particular blade. The blades 40 may be configured to run independently of one another, or groups of two or more blade units may be configured to run in combination. In this manner, system 10 provides a highly flexible computing resource. Furthermore, the presence of multiple blades provides protection against the failure of a blade unit, in that its processing tasks can then be transferred to one or more other blade units, if so desired.

Figure 2:
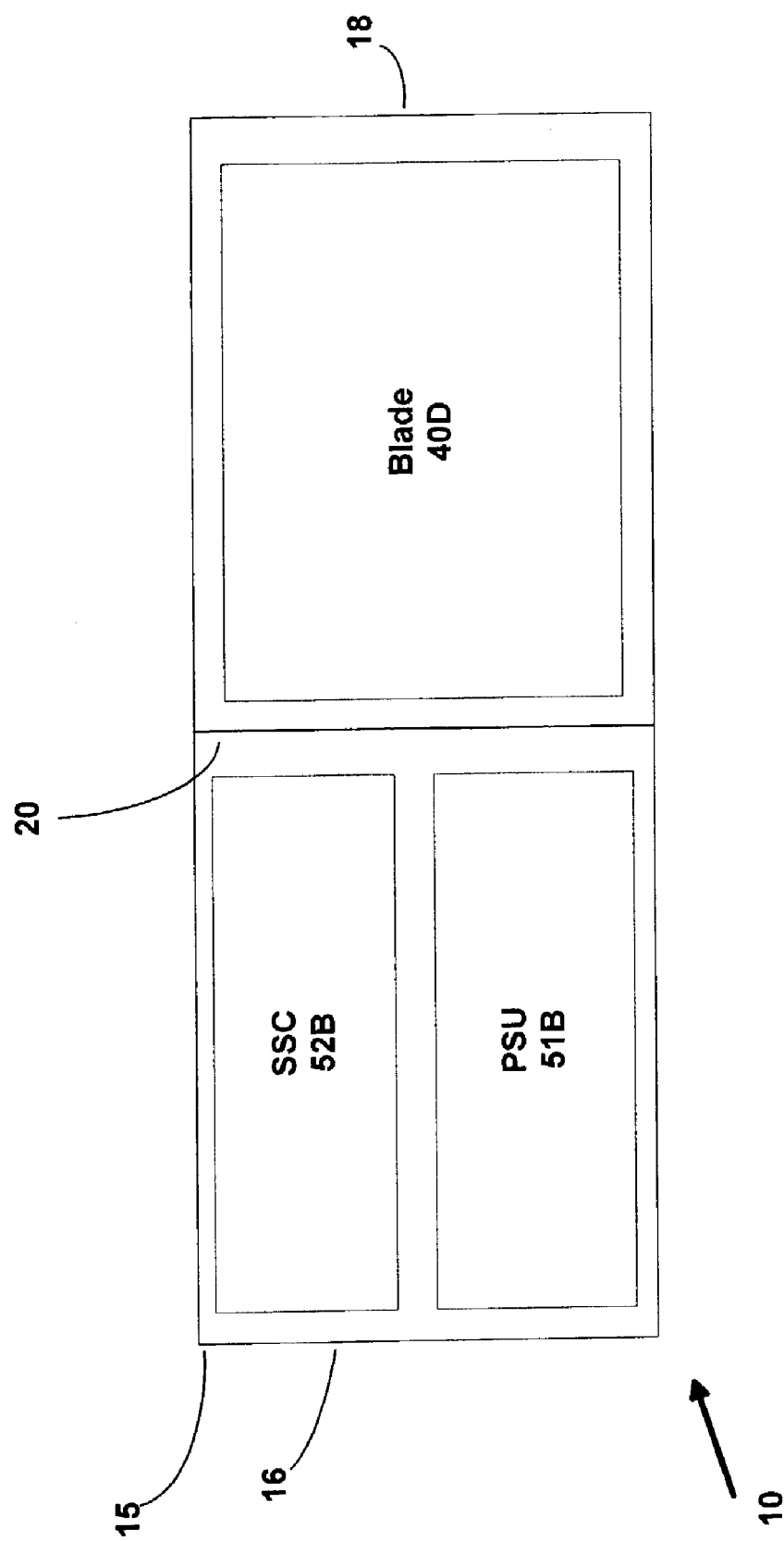
FIG. 2 is a side elevation view of the shelf of the rack-mounted computer of FIG. 1.

The rear portion of the chassis is occupied by the components denoted schematically in FIG. 1 as 50A and 50B. The arrangement of these components is seen more easily in FIG. 2, which is a side elevation of system 10, as if seen looking through side wall 17B. It will be apparent from FIG. 2 that space 50B is occupied by two separate devices, one located on top of the other. The lower device is a power supply unit (PSU) 51B, which provides power to the chassis and to the components therein. The upper component in the rear portion of the chassis is a switching and service controller (SSC) 52B, whose purpose will be described in more detail below.

Note that the chassis actually contains two power supply units 51A, 51B and two SSCs 52A, 52B. Thus there is one pairing of PSU 51B and SSC 52B located in block 50B, while a corresponding pairing of PSU 51A and SSC 52A is located in block 50A. (This latter pairing is hidden from view in FIG. 2). It will be appreciated that by duplicating both the PSU 51 and the SSC 52, the system 10 is provided with redundancy protection against the failure of any one of these units.

It will also be recognised that the particular server configuration of FIG. 1 is provided by way of example only, and that the skilled person is aware of a wide range of other potential arrangements and configurations for servers and for computer systems in general.

Figure 3:
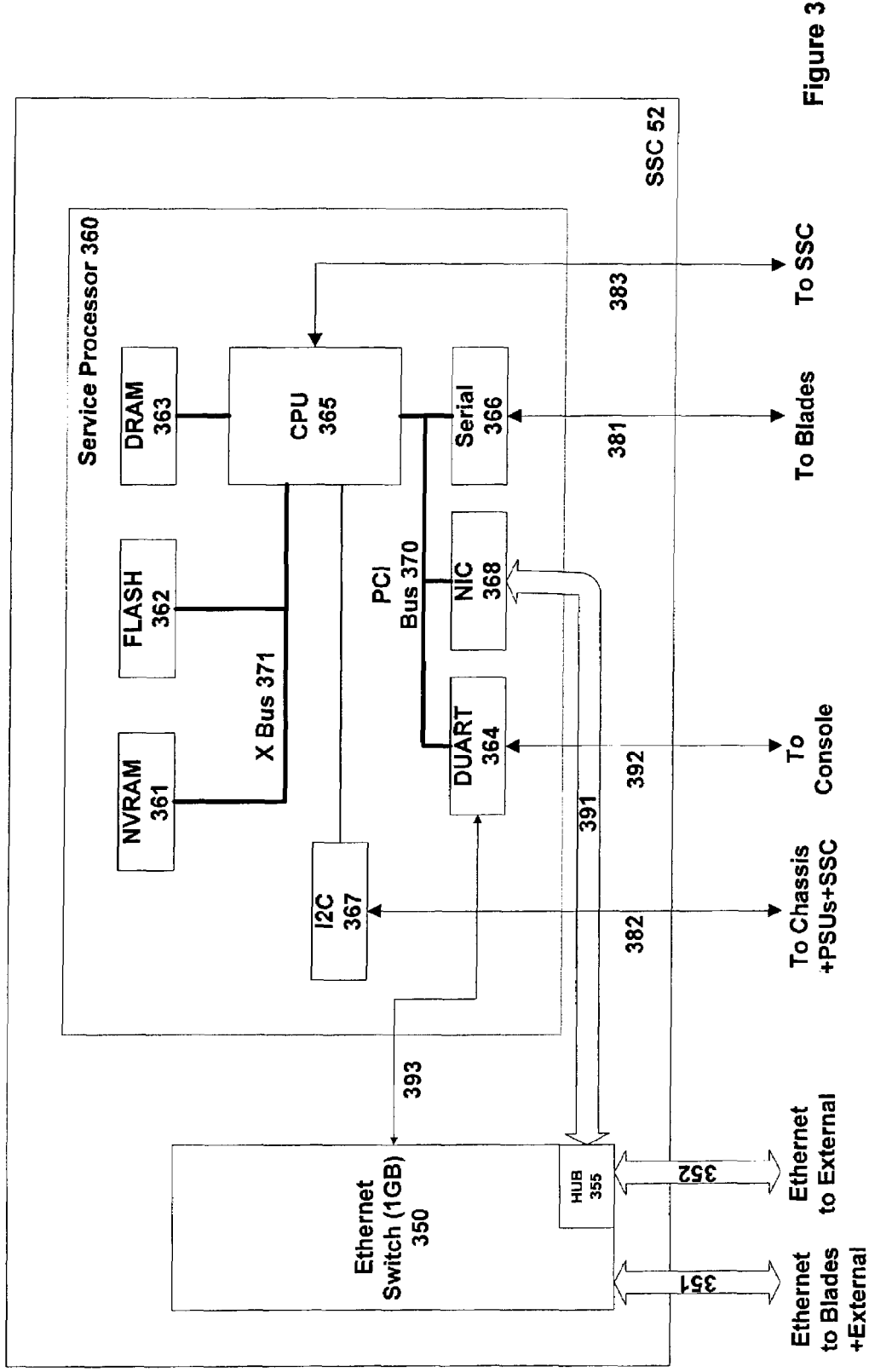
FIG. 3 is a block diagram of a switching and service controller as used in the rack-mounted computer system of FIGS. 1 and 2.

FIG. 3 illustrates the SSC 52 of system 10 in more detail. In one embodiment, the SSC comprises two main components, a 1Gbit Ethernet switch facility 350 and a service processor 360. Each of these two components is formed as a separate printed circuit board (PCB), with the service processor PCB being mounted as a mezzanine PCB on the switch PCB 350. The Ethernet switch has an Ethernet connection 351 to each of the blades 40 and also to an external network, and a further Ethernet connection 352 via hub 355 that provides separate access to an external network. The Ethernet switch 350 therefore allows data to be transmitted at a high capacity via link 351 between the different blades 40 of system 10, as well as being transferred to or from the network. In normal operations, the Ethernet switches in both SSCs 52A, 52B are concurrently active (i.e. an active-active configuration), in order to provide maximum switching capacity. Note that the internal configuration of switch 350 is not shown in detail in FIG. 3, since it is not directly relevant to an understanding of the present invention.

The other main component of the SSC 52 is the service processor 360. At the heart of the service processor 360 is a CPU 365, which in one particular embodiment is a PowerPC chip from Motorola Corporation. This is provided with dynamic random access memory (DRAM) 363 and non-volatile random access memory (NVRAM) 361 to support its processing operations, the latter being attached by an X-bus 371. Also connected to the CPU 365 via X-bus 371 is flash memory 362, which in one particular embodiment has a capacity of 16 Mbytes. This is used as a non-volatile store to hold the software to be executed by CPU 365. In particular, flash memory 362 typically stores a loader routine that allows the service controller 360 to boot up, an operating system, which in one embodiment is the VxWorks operating system, available from Wind River Systems Incorporated (see www.windriver.com), and a service control application.

The service processor 360 also includes a PCI bus 370, to which is attached a dual universal asynchronous receiver and transmitter (DUART) unit 364. The DUART unit 364 provides two serial connections from the service processor 360, the first representing a link 392 to an external console (not shown in FIG. 3), while the second 393 is connected to the switch 350 (on the same SSC 52). The console link 392 allows a user to access various control and administration programs on the service processor, in order to manage operations of system 10. Thus the console can be used to configure the service processor 360, and through it also the individual blades 40.

PCI bus 370 also connects the CPU 365 to a serial bridge 366, which is linked to a serial connection 381 that runs to each of the blade units 40. This is used by the service controller 360 to send appropriate commands to the blade units, and then to receive data and responses back from the blade units. CPU 365 also has a direct serial link 383 to the other SSC in the system, which therefore allows either service processor 360 to take responsibility for overall control and monitoring of the system.

Further attached to the PCI bus 370 is a network interface card 368, which provides an external Ethernet connection via link 391 to hub 355 on the switch 350, and from there over Ethernet link 352. The service controller software supports a management network interface that exposes the diagnostic and operational information collected by the service controller 360 to external application programs. This external monitoring can be performed either from a console, over link 392, or from a remote system over link 391 and an attached network, such as the Internet (not shown in FIG. 3). This external management facility may be used to perform system administration tasks, such as determining which application will run on which blade, and so on.

The SSC 52 also includes an I2C bridge 367, which connects to an I2C link 382. The I2C link runs to the chassis and to each of the power supply units 51A, 51B, as well as to the other SSC. Note that I2C is an industry standard bus for obtaining diagnostic operating information, such as regarding temperatures and voltages, and was originally developed by Philips Electronics N.V. of the Netherlands. Further information about I2C is available at page buses/i2c/ available from the site: www.semiconductors.philips.com/.

In one particular embodiment, the pair of service processors 360A, 360B (corresponding to the service processor in SSC 52A and 52B respectively) operate in active-standby mode. In other words, at any given time, only one of the pair of service processors is actively monitoring the operation of system 10. The other (stand-by) service processor then monitors the active service processor, in order to ensure that it is operating properly. If a fault is detected in the active service processor, the stand-by service controller then takes over responsibility for monitoring the system 10 (i.e. the stand-by service processor becomes the active service processor).

Note that although not specifically shown in FIG. 3, in one embodiment the physical routing of each external link from service processor 360 is via the PCB for switch 350. Furthermore, for simplicity, Ethernet links 351 and 352, serial links 381 and 383, and I2C link 382 are each shown in FIG. 3 as single connections. However, it will be appreciated that in practice these links will be implemented using any suitable routing, and by as many separate connections to their respective targets as appropriate.

Figure 4:
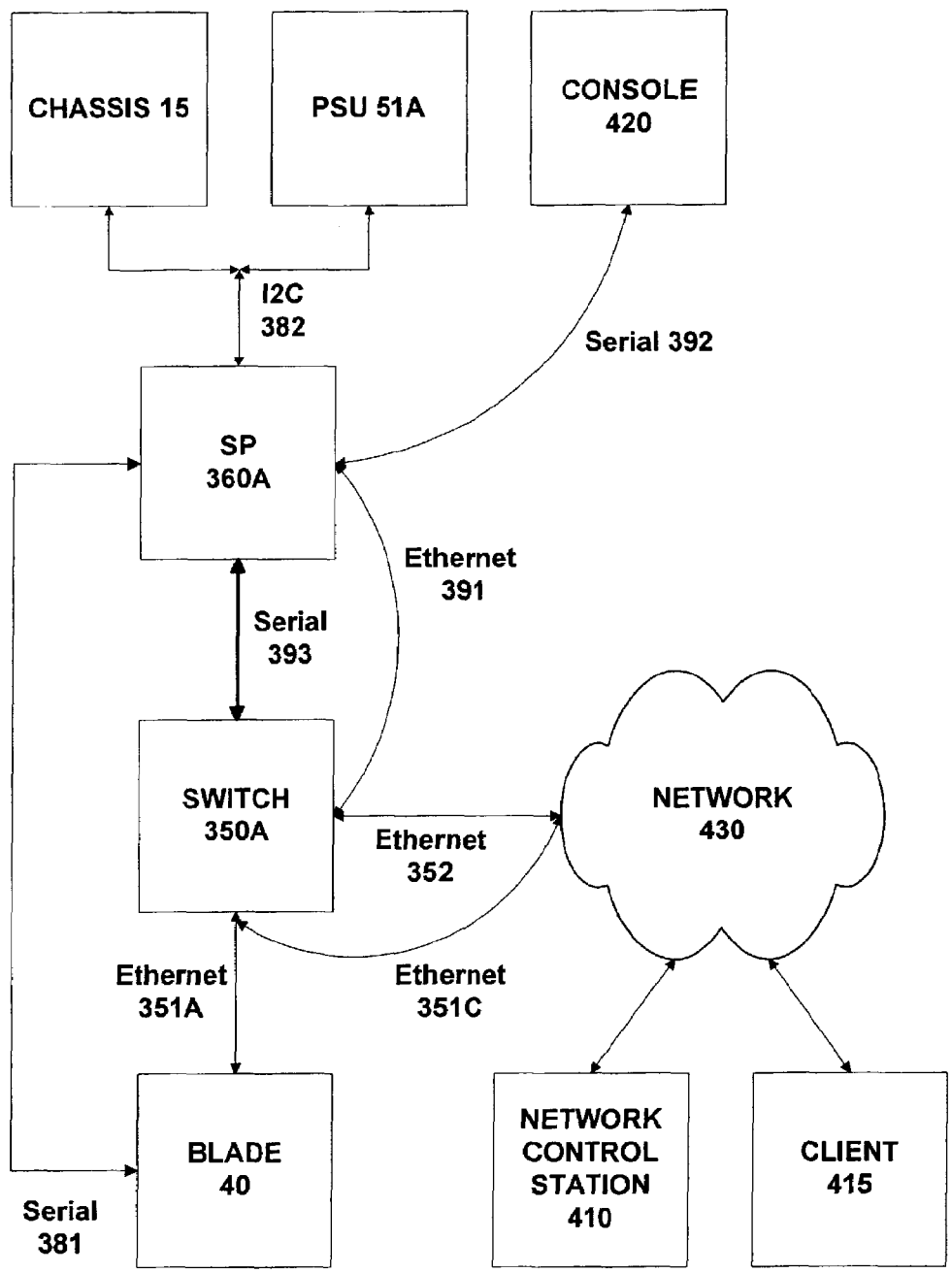
FIG. 4 is a diagram illustrating various connections involving components of the rack-mounted computer system of FIGS. 1 and 2.

FIG. 4 illustrates some of the connections involving system 10. Note that for simplicity, FIG. 4 only includes a single switch 350A, a single service processor 360A, a single PSU 51A, and also only a single blade 40. It will be appreciated that the connections of the omitted components generally mirror the connections of the corresponding components shown. For example, each blade 40 has an Ethernet connection 351A to switch 350A and a serial link 381 to service processor 360A. In addition (although not shown in FIG. 4), each blade 40 also has a separate Ethernet connection to the other switch 350B, and a separate serial link to the other service processor 360B. (Note that there are no links directly from one blade to another).

Switch 350A has a serial link 393 to service processor 360A (i.e. the service processor in the same SSC, namely SSC 52A), and an Ethernet link 351C to an external network 430. Network 430 can represent any suitable form of network, such as the Internet, a corporate intranet or extranet, and so on. As shown in FIG. 4, a client 415 is attached to network 430 (only a single client is shown, but of course in practice the number of clients attached to network 430 may in fact be very large). In a typical installation, client 415 interacts via network 430, switch 350A, and Ethernet links 351A, 351C, with a Web server program running on blade 40, in order to exchange http requests and responses.

The service processor 360A is also provided with an Ethernet link 391 to network 430 via switch 350A and link 352. As previously indicated this allows remote control and configuration of system 10 from a remote terminal, such as network control station 410. Note that in some implementations, Ethernet links 352 and 351C may be connected to different networks. For example, the blades 40 may be attached to the Internet via links 351A and 351C, to act as a WorldWideWeb server, whereas for security reasons the service processor 360 may only be accessible via link 352 from an internal network.

Also shown in FIG. 4 is a serial link from service processor 360A to console 420. This typically provides a local interface for controlling system 10 (as opposed to the use of network control station 410). Service processor 360A also includes a further serial link to the other service processor 360B (i.e. to the service processor on the other SSC, namely SSC 52B—not shown in FIG. 4). This link allows the stand-by service processor to monitor the operation of the currently active service processor, so that it can take over in the event of a fault. In addition, service processor 360A is also connected to the chassis 15 and power supply unit 50A by an I2C bus 382, for various control and diagnostic operations, as described above.

Figure 5:
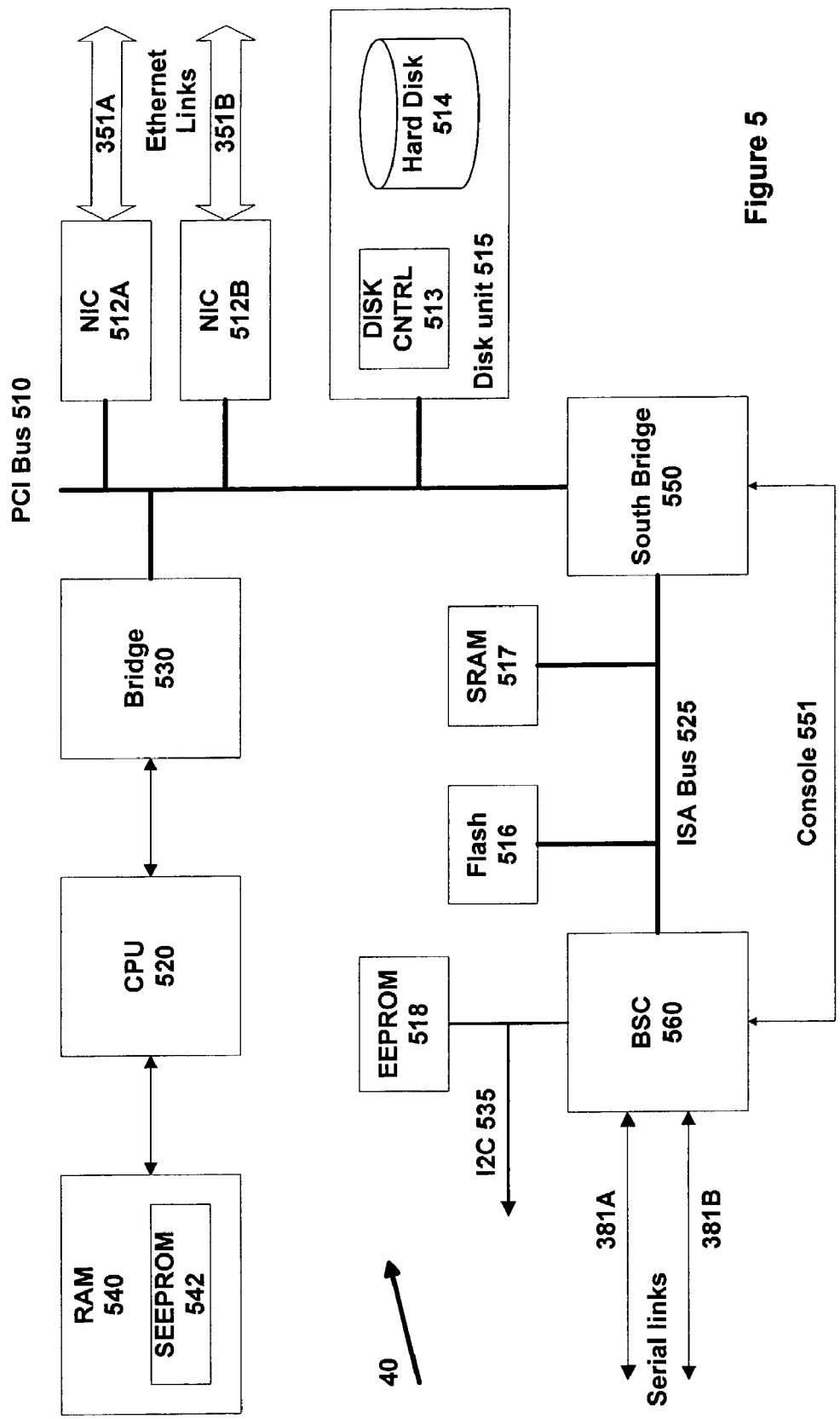
FIG. 5 is a block diagram of a blade unit as used in the rack-mounted computer system of FIGS. 1 and 2.

FIG. 5 illustrates an embodiment of a blade 40 in accordance with one embodiment of the invention. The overall functioning of the blade is generally managed by a CPU 520, which is connected to random access memory (RAM) 540. In one particular embodiment, RAM 540 is provided by up to four dual in-line memory modules (DIMMs). Associated with RAM 540 is a serially electrically erasable programmable read only memory (SEEPROM) 542.

The blade 40 also includes a blade service controller (BSC) 560. The BSC 560 provides control and management services for blade 40, and has a serial link to the service processor (see FIG. 3). In particular, serial link 381A runs to service processor 360A in one SSC 52A, while serial link 381B runs to the service processor 360B in the other SSC 52B. In this manner, whichever service processor 360 is currently active can use its respective serial link 381 to receive operational information from the blade 40, and to send appropriate control commands to the blade 40. Such commands may cause the BSC 560 to send various instructions to the CPU 520, in order to perform the operations desired by the service processor 360.

As well as serial links 381A, 381B, the BSC 560 is also linked to an I2C bus 535. This is used to monitor various operating parameters of the blade 40, such as temperature, voltage, and so on. The BSC 560 is then able to then report this information back over serial link 381 to the service processor 360, or at least to alert the service processor should the data received over the I2C link indicate that there is some anomalous condition on the blade 40. The BSC is further connected to electrically erasable programmable read only memory (EEPROM) 518.

The CPU 520 is attached via bridge 530 to a PCI bus 510. Attached to the PCI bus 510 are two network interface cards, 512A, 512B, each of which is connected via a respective Ethernet link to a corresponding switch 350. Thus link 351A connects the blade 40 to switch 350A on SSC 52A, while link 351B connects the blade to switch 350B on SSC 52B. These two cards therefore allow the blade 40 to transmit and receive data for normal processing operations, such as by exchanging data with other blades in system 10, or with devices such as client 415 on network 430.

Further attached to PCI bus 510 is a disk unit 515 comprising one or more hard disk drives 514 and an associated disk controller 513 (which may be integrated into the hard disk drive 514). Disk unit 515 provides local mass storage for code and data used by the blade 40. Note that such code and/or data may also be downloaded over a network link 351 for execution on CPU 520 and/or storage in disk unit 515, although in general faster access will be obtained if the desired material is already present locally on disk unit 515.

Blade 40 also incorporates a south bridge 550, which interfaces the PCI bus 510 to an ISA bus 525. The south bridge 550 also has a serial link 551 to the BSC 560 for providing a console input/output signal, which in turn is fed via serial link 381 to the service processor 360 (and from there to console 420 via serial link 392, as shown in FIG. 4).

Attached to the ISA bus 525 are the BSC 560, as previously discussed, plus flash memory 516 and static random access memory (SRAM) 517. The flash memory 516 is typically used to store the boot code for blade 40, and also its power-on self-test (post) code. The boot code can be arranged to configure the blade 40 to control whether to load the operating system and/or desired application from disk unit 515, or whether to download one or both of them over network link 351.

As previously indicated, system 10 is designed to have a modular structure. Thus certain components within system 10 are field replaceable units (FRUs), whereby an FRU may be added in situ into an operational system 10. This service action can be undertaken either as a replacement for an existing unit (whether because the existing unit has failed, or because it no longer has sufficient capacity and so needs to be upgraded), or to supplement the existing configuration, such as by adding another blade into the system (assuming that there is a suitable vacant slot).

Figure 6:
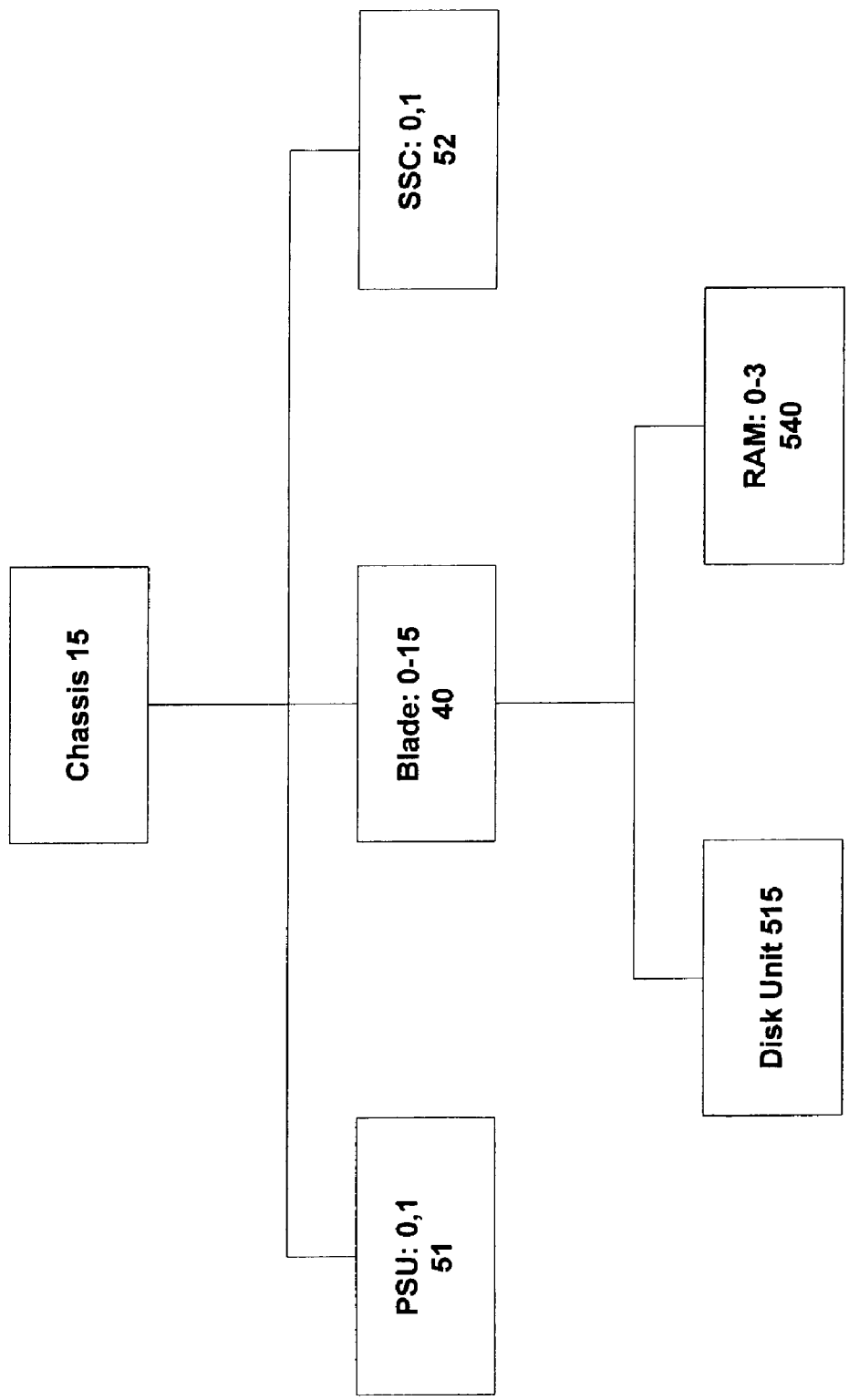
FIG. 6 is a schematic representation of the hierarchical arrangement of field replaceable units (FRUs) in the rack-mounted computer system of FIGS. 1 and 2.

FIG. 6 illustrates the tree or hierarchical configuration of FRUs in system 10. At the top of this hierarchy is the chassis 15, which provides the framework of system 10. Note that strictly speaking chassis 15 is not itself a FRU, since it cannot be replaced without in effect dismantling the entire system, but nevertheless it is able to represent the top of the hierarchy.

Three different types of FRU can be accommodated within chassis 15, namely a power supply unit 51, a blade unit 40, and a switching and service controller 52. Each of these can be individually replaced within system 10. In the illustrated embodiment, up to two power supply units, up to two SSCs, and up to sixteen blades can be installed into system 10.

In this particular embodiment, there are no FRUs within a power supply 51 or within an SSC 52. In other words, if a component inside a power supply unit 51 were to fail, the whole power supply unit would be replaced at the customer location. (Of course, depending on the particular nature of the fault, the power supply unit removed from the system may subsequently be refurbished by repair or replacement of the failed component). Likewise, if a component within the SSC 52 fails, then the complete SSC is replaced in the field.

On the other hand, blade 40 does include two FRUs, namely RAM 540 and disk unit 515. Thus as previously indicated, RAM 540 is provided in one embodiment as dual in-line memory modules (DIMMS) that fit into four available slots within the blade unit 40. An existing DIMM may be replaced, either because it has failed, or because it is desired to enhance memory capacity by inserting a larger DIMM in its place. Alternatively, memory capacity may be increased by inserting a DIMM into a previously vacant slot (if any are available).

Likewise disk unit 515 is also an FRU. As with RAM 540, the disk unit 515 may be replaced, either because the existing unit has failed, or because it is desired to increase storage capacity by inserting a larger unit in its place. In the illustrated embodiment, there is only a single disk drive bay within blade 40, but it will be appreciated that other systems may potentially have multiple such bays.

Thus overall, we can regard FIG. 6 as illustrating a FRU tree structure, with a chassis 15 at the top of the tree (also termed the root of the tree). Progressing one level down the tree from the chassis 15, we come to the PSU 51, the blade 40 and the SSC 52. Since it is not possible to go any further down the tree from PSU 51 or SSC 52, in that they do not have any subsidiary FRUs, these can be referred to as leaf nodes of the tree. On the other hand, from blade 40 it is possible to drop down another level to RAM 540 and disk unit 515. Consequently RAM 540 and disk unit 515 can be regarded as subsidiary units of blade 40, while PSU 51, blade 40 and SSC 52 can be regarded as subsidiary units of the chassis 15.

Each FRU in system 10 maintains history information that is useful for diagnostic purposes. This includes both static data, such as details about when and where the FRU was manufactured, and also dynamic data, representing a record of the operational history of the FRU, such as information concerning past error rate, maximum temperature, and so on.

The FRU history information for SSC 52 is maintained in NVRAM 361 of the service processor 360 (see FIG. 3), while for blade 40 the information is kept in EEPROM 518. The FRU history for RAM 540 is stored in SEEPROM 542, while for disk unit 515 the FRU history is handled by disk controller 513. The power supply units 51A and 51B and the chassis 15 each include an EEPROM (not shown in the Figures) in which to store FRU history information.

It will be appreciated that the FRU hierarchy illustrated in FIG. 6 is by way of example only, and will vary from one system to another. For example, even within the structure of blade 40, it may be that in some embodiments the NICs 351A, B are also FRUs. Furthermore, disk unit 515 may comprise an array of one or more hard disks 514. In this case, the array form a subsidiary FRU for the blade 40, while hard disk 514 may form a subsidiary FRU of the array. In other words, the whole array could be replaced within a blade, or just a single hard disk drive 514 within such array (this would then add a further level to the FRU hierarchy).

Figure 7:
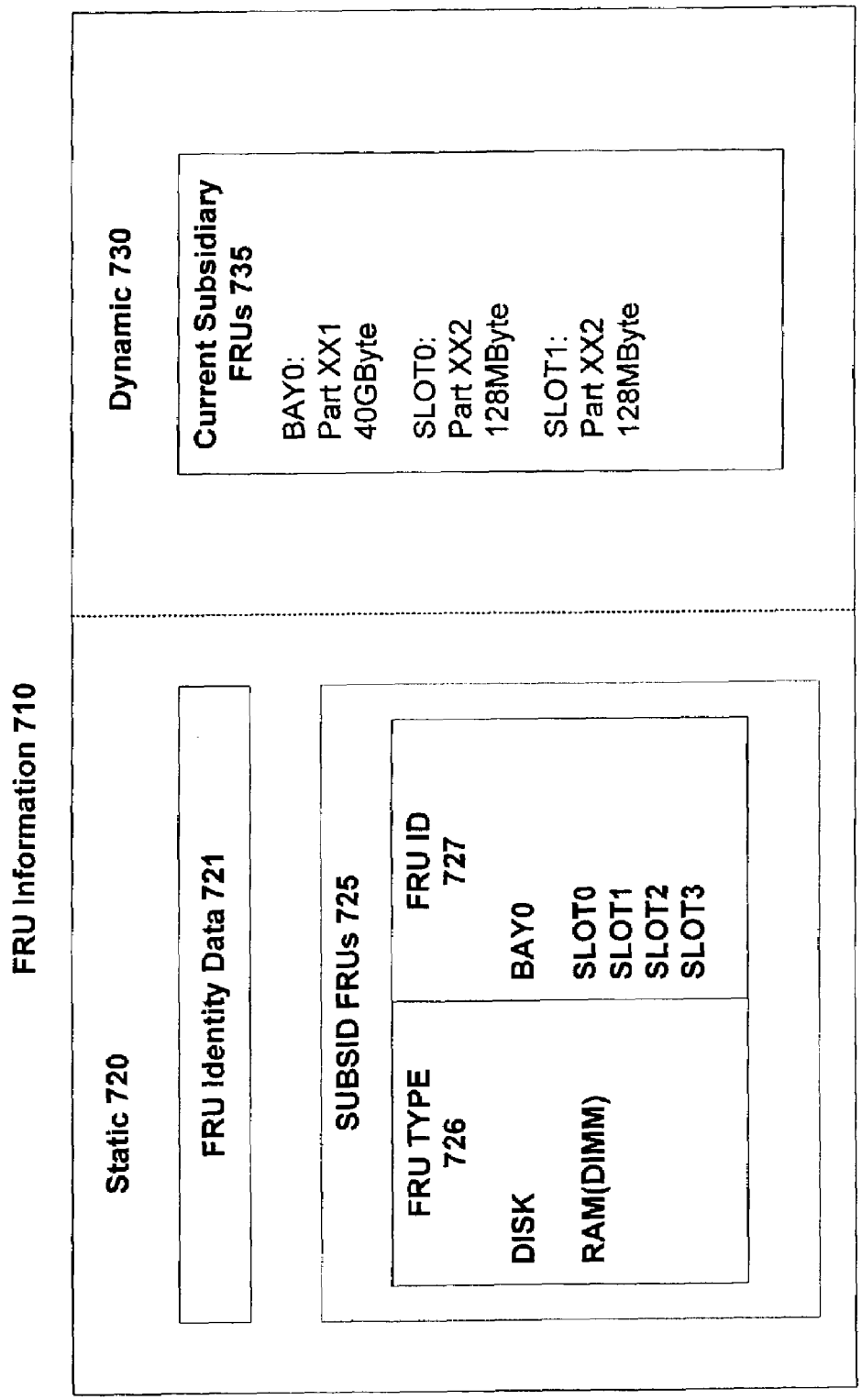
FIG. 7 is a simplified schematic representation of information stored for each FRU in the rack-mounted computer system of FIGS. 1 and 2.

FIG. 7 illustrates the general layout of FRU history information 710 for one of the FRUs of system 10 (for the purposes of illustration, FIG. 7 depicts EEPROM 518 in one of the blades 40). This information is divided into two portions, a static portion 720, which is completed when the device is manufactured, and a dynamic portion 730, which is updated during the operational lifetime of the device.

Included in static portion 720 is a set of FRU identity data 721. This contains information about the type of FRU, such as part number, and so on. Furthermore, in accordance with one embodiment of the invention, a set of information 725 about subsidiary FRUs is also included within static portion 720. Thus information block 725 is used to store data concerning the potential subsidiary FRUs for the FRU identified in block 721 (i.e. for the FRU that contains information 710). For example FRU subsidiary information 725 for chassis 15 would give specify PSU 51, blade 40 and SSC 52, while FRU subsidiary information 725 for blade 40 (as shown in FIG. 7) would specify RAM 540 and disk unit 515. On the other hand subsidiary information block 725 would be empty for PSU 51, SSC 52, RAM 540 and disk unit 515, since none of these has a subsidiary FRU.

Considering now the information within block 725 in more detail, in one embodiment this is provided as a listing in the form of simple ASCII data, but any other appropriate data structure, coding or format could be used. Each entry in the listing contains a description or specification of the relevant type of FRU 726 and then an associated set of identifiers 727 for that FRU type. Thus for chassis 15, three FRU types 726 would be listed, namely PSU 51, blade 40 and SSC 52, while for blade 40 two types of FRU type 726 are listed, namely RAM 540 and disk unit 515 (as shown in FIG. 7). For each specified type of FRU 726, one or more identifiers 727 are provided, one for each subsidiary FRU of the corresponding type that can be accommodated within the FRU. For example, the FRU subsidiary information 725 for chassis 15 contains two FRU IDs 727 corresponding to the FRU type for PSU 51A and PSU 51B, two FRU IDs 727 for the FRU type 726 corresponding to SSC 52A and 52B, and sixteen FRU IDs 726 corresponding to the FRU type 726 for the blades 40.

FIG. 7 illustrates the subsidiary FRU data 725 for a blade 40, on the assumption that this accommodates up to a single disk unit 515 and up to four DIMMs as part of RAM 540. In this case, there is only a single FRU ID corresponding to the disk unit FRU type 726 (depicted as BAY0 in FIG. 7), and four FRU IDs corresponding to the DIMM FRU type 726 (depicted as SLOT0, SLOT1, SLOT2 and SLOT3 in FIG. 7).

The FRU ID 727 (BAY0, SLOT0, etc) is typically provided as a hardware address for the subsidiary FRU in question. Thus the FRU ID 727 for a blade 40 represents the hardware address at which that particular blade 40 is accommodated in the system. Likewise, SLOT0 corresponds to the physical address for a DIMM located in the first slot of a blade, and so on. Note that these addresses can normally be determined at manufacture, since they are generally defined by the hardware architecture of the device, rather than any subsequent installation or configuration process.

It will be appreciated that the FRU type 726 primarily represents the form of an available slot or interface, rather than necessarily providing details of the function of a subsidiary FRU (if any) actually fitted to that particular slot or interface. This is because the latter is not known in advance, and so cannot be recorded in static memory 720. Of course, in some cases the function of the FRU is largely determined by the type of slot (e.g. a DIMM slot is only for taking memory modules), but this does not always apply. For example, a subsidiary FRU may be specified in data 725 as a PCI card, an ISA card, or a PCMCIA card, etc, in accordance with how it is to be attached. However, this does not provide any indication of the particular function of the card, e.g. whether it is a graphics card, a network interface card, and so on (since this may change if one subsidiary FRU is replaced by another).

In the example shown in FIG. 7, the dynamic portion 730 of FRU information 710 incorporates a section 735 on current subsidiary FRUs. In other words, this information 735 details those subsidiary FRUs that are actually installed at present into the FRU containing information 710. (In contrast, static FRU data 725 details those subsidiary FRUs that are potentially available for installation, irrespective of whether or not they actually are installed). Thus in the example shown in FIG. 7, it is assumed that the FRU (a blade 40) has one disk unit installed and two DIMMS. The disk unit is denoted as part number XX1, and has a 40 Gbyte capacity, whereas two of the DIMM slots are occupied (SLOT0 and SLOT1), both by a 128 MByte DIMM having a part number denoted as XX2. It is further assumed that the two DIMM slots identified as SLOT3 and SLOT4 are currently vacant.

Note that current subsidiary FRU data 735 is generally acquired and saved whenever a subsidiary FRU is inserted or removed. Thus when the subsidiary FRU is inserted, the FRU part data 721 is read from the newly inserted FRU, and stored in section 735. (A potential mechanism for doing this is discussed in more detail below). On the other hand, it should be appreciated that some embodiments may not store such current subsidiary FRU data 735, perhaps (for example) because they do not have a dynamic portion 730 available within FRU information 710.

Within system 10, it can often be useful to generate a listing of the different FRUs that are currently present within the system. There are various possible reasons for wanting to do this, such as for inventory management, or for efficient workload distribution (e.g. a particular task for allocation to one of the blades in the system may generally require a disk unit or RAM of a given capacity). In addition, knowledge of the FRU hierarchy can be valuable for diagnostic purposes. For example, if a particular error is observed, it may be known that one potential source of this error is the presence of a given FRU (or combination of FRUs). Thus determining whether a particular FRU or FRUs is (are) present can help to isolate the cause or origin of the observed error.

Accordingly, system 10 enables FRU information for the system 10 to be automatically acquired and consolidated into a single report or listing. This information, which can be regarded as corresponding to the FRU tree for the system 10 (such as illustrated in FIG. 6), can then be passed to a service engineer, an inventory management program, and so on, for use as desired. In one particular embodiment, this consolidation is performed by the service processor 360, which obtains the subsidiary FRU information 725 from all the various FRUs included within the system 10.

Figure 8:
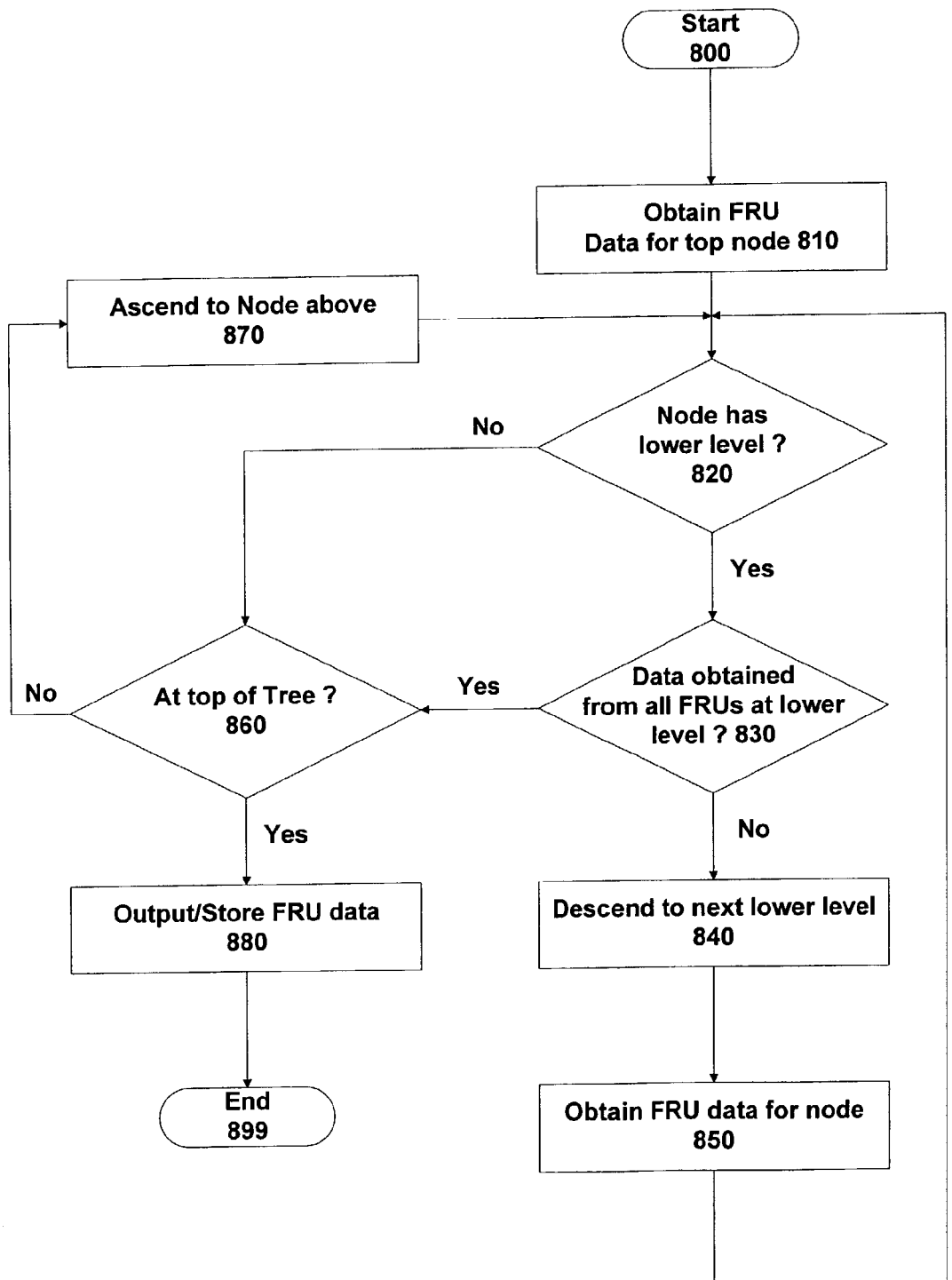
FIG. 8 is a flowchart showing how the FRU information from various FRUs is collated in accordance with one embodiment of the invention.

FIG. 8 illustrates the procedure adopted by the service processor in order to build the FRU tree in accordance with one embodiment of the invention. Commencing at start 800, the method first obtains FRU data 710 for the top node in the hierarchy (step 810). For the system illustrated in FIG. 6, this top node represents the chassis 15. (As previously discussed, chassis 15 is not an actual FRU in the sense of being able to be replaced in the field, but it is provided with stored data analogous to that illustrated in FIG. 7). For constructing a FRU tree such as shown in FIG. 6, information blocks 721 and 725 (at least) are retrieved at step 810. The remaining FRU information 710 may also be accessed, depending perhaps on why the FRU data is being acquired. For example, much of the dynamic data 730 (e.g. about the environmental history of the FRU) may be very useful if the FRU tree is to be used for diagnostic purposes, but may be of little interest if it is intended for inventory management.

Proceeding next to step 820, a test is made to see whether the node has a lower level. Consequently, the service processor examines the subsidiary FRU data 725 that it has just retrieved from the chassis 15, and determines in particular if there are any entries in the subsidiary FRU section 725 (see FIG. 7). In the case of chassis 15, it will be appreciated that the test of step 820 is positive, in that there are three FRUs at the next lower level. In other words, the subsidiary FRU data 725 for chassis 15 lists three FRU types 726, namely a power supply unit 51, an SSC 52, and a blade 40. (Note that for the moment we are assuming that dynamic FRU subsidiary data 735 is not available).

Figure 9A:
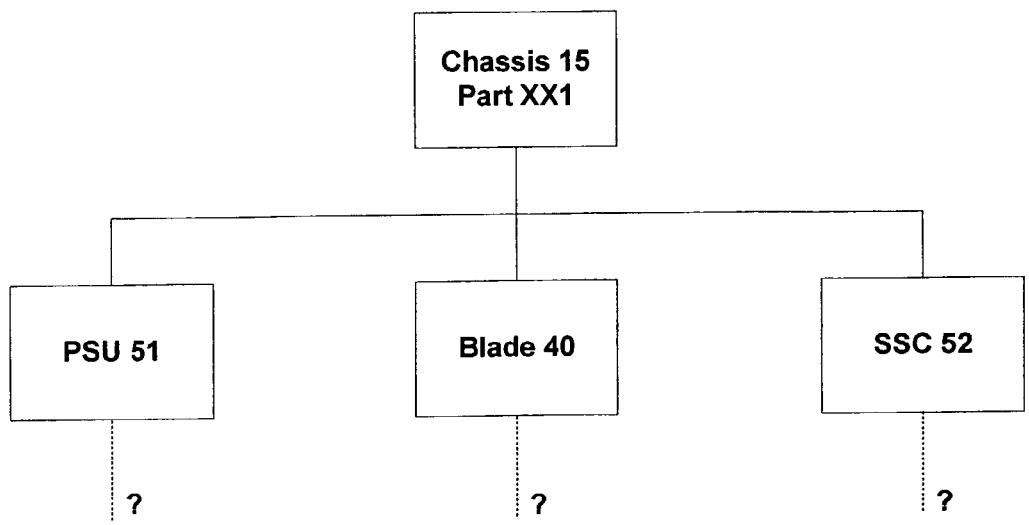
FIGS. 9A–F are diagrams analogous to FIG. 6, illustrating the FRU information acquired at various stages of the procedure of FIG. 8.

At this point the service processor can begin to construct the FRU tree for system 10, as shown in FIG. 9A. Thus the service processor knows the type of device at the top of the tree as well as its identity from FRU data block 721 in the chassis (e.g. part number, represented schematically as XX1 in FIG. 9A), and also knows its potential subsidiary devices from FRU block 725. However, it does not yet know which subsidiary devices are actually present in this particular installation (again assuming that chassis 15 does not have a current FRU data block 735), nor does the service processor know whether there are any still lower levels in the tree (i.e. below those subsidiary FRUs already identified).

The service processor therefore proceeds to step 830, where a test is made to determine whether or not FRU data 710 has been obtained for all the FRUs at the next lower level, as identified in the previous step (i.e. at step 820). At this point, it will be appreciated that no FRU data has been obtained for any of the three identified subsidiary FRUs (PSU 51, SSC 52, and blade 40), and so the outcome of test 830 is negative.

Accordingly, the service processor now descends to the next lower level in the hierarchy (step 840). It will be appreciated that there is a choice here concerning which of the three different subsidiary FRU types 726 for chassis 15 to select. These can be processed in any order (provided that they are all handled in due course). For present purposes, we will assume that the service processor examines them in the order in which they are listed within the subsidiary FRU information 725 of chassis 15 (and corresponding to the layout of the FRU tree of FIGS. 6 and 9A).

Figure 9B:
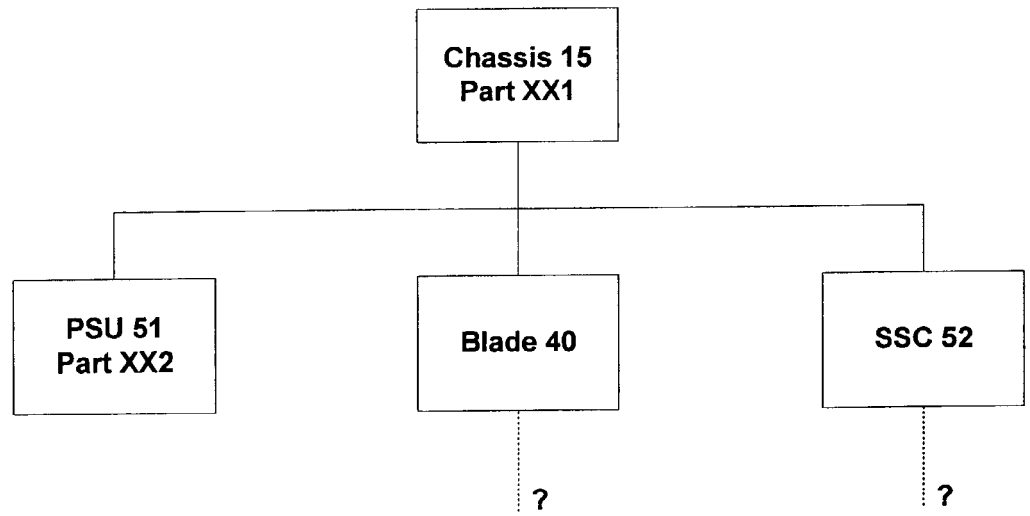

Thus the service processor descends at step 840 to PSU 51, and obtains the FRU data 710 for this node (step 850). We now loop back up to step 820, where the subsidiary FRU data 725 obtained at step 850 for the PSU 51 is investigated, and it is determined that the PSU does not have any subsidiary FRUs. Furthermore, from block 721 of the FRU information 710 retrieved from PSU 51, the identity or part number of this FRU can be determined. The service processor has now completed its knowledge of this particular branch of the FRU tree, as illustrated in FIG. 9B (again part numbers are only shown schematically).

Taking now therefore the negative outcome from step 820 leads to step 860, which again tests negative since we are not at the top of the tree (i.e. we are not at the chassis 15). Accordingly, processing ascends at step 870 to the node above the current one, in other words returning from the PSU 51 to the chassis 15.

Figure 9C:
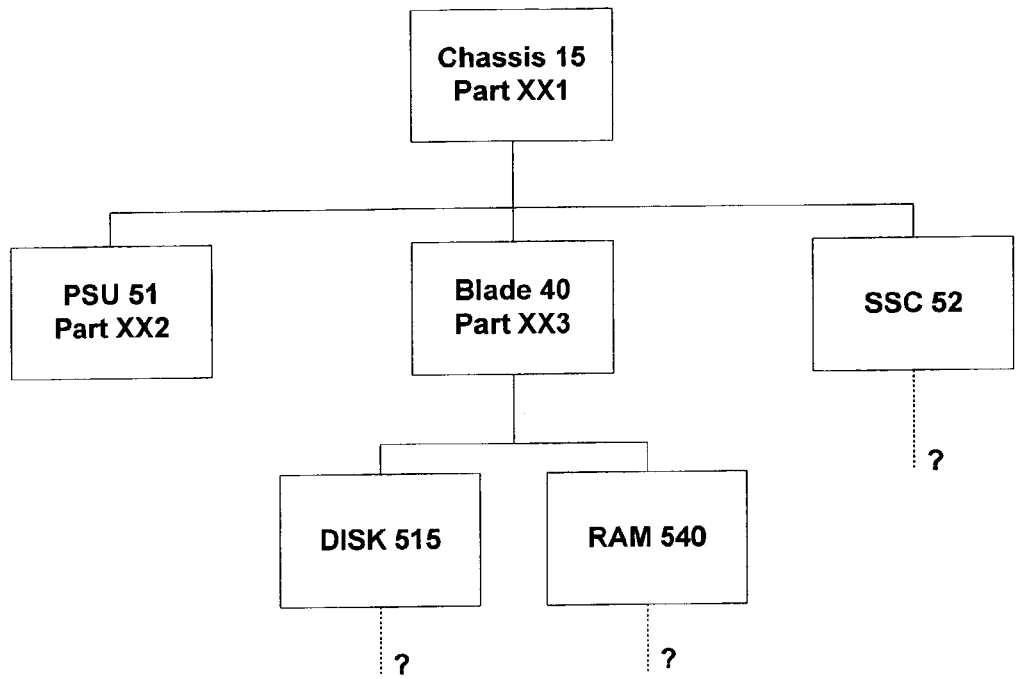

We now return through step 820, again taking the positive branch, and through step 830, again taking the negative branch (since not all potential subsidiary FRUs of the chassis 15 have yet been investigated). Accordingly, the service processor arrives back at step 840, but this time descends to blade 40. The service processor therefore obtains the FRU data 710 for blade 40 (step 850), whereupon we loop back to step 820. At this point the service processor can construct the FRU tree to the extent shown in FIG. 9C. Thus compared to FIG. 9B, the part identity of the blade 40 is known, as well as its potential subsidiaries, based on FRU block 721 and the FRU block 725 respectively, as retrieved from blade 40. However, no information is yet available about the whether blade 40 actually has any subsidiary FRUs installed, or whether they in turn might have subsidiary FRUs themselves.

Figure 9D:
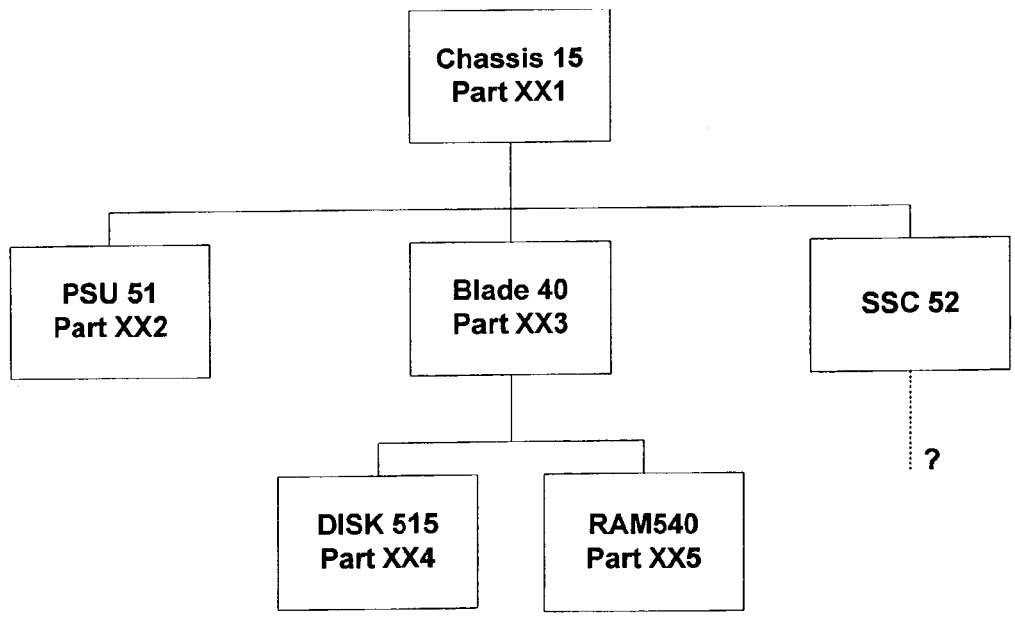

The test at step 820 is now positive, since blade 40 does indeed have lower levels, while the outcome from step 830 is negative. The service processor therefore descends at step 840 to disk unit 515, and retrieves its FRU data 710 (step 850). This reveals the part identity of the disk unit (from block 721), as well as the fact that it does not have any potential subsidiary FRUs (i.e. block 725 is empty or simply missing). The method therefore takes the negative outcome from step 820, as well as from step 870, returning us to blade 40. The service processor then proceeds again through steps 820 and 830, this time descending at step 840 to RAM 540 to retrieve its FRU information 710 (step 850). The service processor can now complete the second branch of the FRU tree, as shown in FIG. 9D.

Looping back again to step 820, we now take the negative option to step 860 (since the RAM 540 does not have any lower levels), and go via step 860 to step 870, where we ascend back to blade 40. Processing then continues through the positive outcome of step 820. Step 830 also gives a positive outcome this time, since both lower branches from blade 40 (i.e. disk unit 515 and RAM 540) have already been investigated. We therefore go through step 860 and ascend once more at step 870, this time back to chassis 15.

Figure 9E:
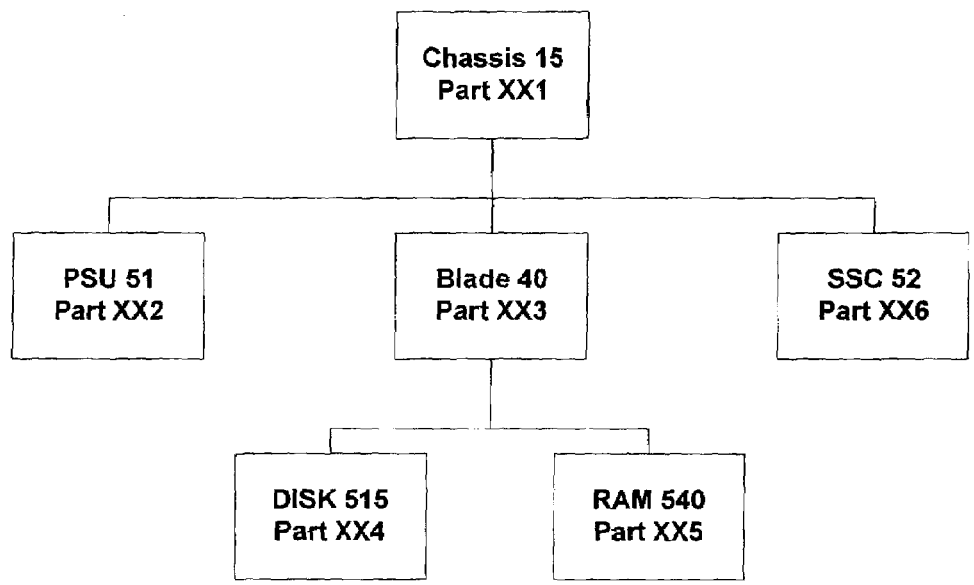

The service processor now proceeds through step 820 and then step 830, and descends at step 840 to SSC 52. The FRU information for SSC 52 is then retrieved (step 850), which allows the FRU tree to be updated as shown in FIG. 9E. Processing then continues via step 820 and step 860 to step 870, where we ascend once more to the chassis 15. We then proceed through step 820 again, but take the positive outcome from step 830, since all the branches from chassis 15 have now been investigated. Furthermore, step 860 also now tests positive, and so the final FRU listing (i.e. the representation of FIG. 9E) can be output or stored as appropriate (step 880). Processing then finally terminates (End 899).

It will be appreciated that, for clarity, the above explanation has made the simplifying assumption that there is only a single instance of each type of FRU (i.e. that chassis 15 only accommodates a single PSU 51, a single blade 40, and a single SSC 52, and that blade 40 only accommodates a single disk unit 515 and single RAM 540). Of course, in the particular embodiment depicted in FIG. 6, multiple instances of certain FRUs can be present. In this case, rather than looping round once for each particular FRU type, the method of FIG. 8 will investigate each instance of that FRU type. For example, for the two power supply units PSU 51A and PSU 51B, the first encounter with step 840 will descend to PSU 51A, and the second will descend to PSU 51B, before moving on to consider blades 40. Similarly for blade 40, the test of step 830 will only be positive when disk unit 515 and all four potential DIMM slots have been investigated.

Figure 9F:
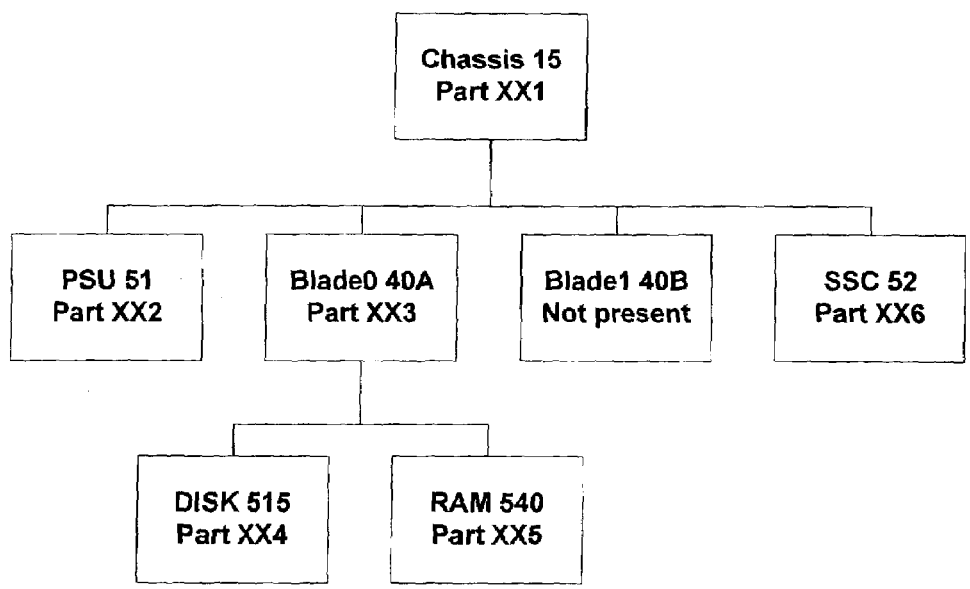

This also leads to an extension of the FRU tree shown in FIGS. 9A–E, since in the full version each FRU type will be replicated according to the number of potential instances that may be present. This principle is illustrated in FIG. 9F, where separate boxes are drawn for blade0 40A and blade1 40B. Note that in this particular installation it is assumed that blade1 is not actually present. In other words, when an attempt is made to read the FRU information 710 for blade1 (at step 850 in FIG. 8), the service processor discovers that it is absent (i.e. the slot for blade1 is currently unoccupied), and so no FRU information 710 is returned for this blade. This can then be recorded in the FRU tree maintained by the service processor, as shown in FIG. 9F. Of course, since blade1 is not present, there cannot be any subsidiary FRUs for it (again as illustrated in FIG. 9F).

It will be appreciated that FIG. 9F still only shows a part of the FRU hierarchy. Thus the complete tree corresponding to the system of FIG. 6 has two boxes for PSU 51, two boxes for SSC 52, and sixteen boxes for blades 40. Each blade 40 would then have appropriate subsidiary FRU information of its own. It is important to recognise however, that the subsidiary FRU information for each blade 40 need not necessarily be the same. For example, some blades in system 10 may have two DIMM slots, while others may have four such slots. Likewise some blades may perhaps have two disk drive bays, or not support any disk drive bay at all.

Nevertheless, because the procedure of FIG. 8 iteratively reads the FRU information 710 from each FRU installed in system 10, such variations can be accommodated, and the full correct tree will be derived. This protects the system against future possible upgrades to the subsidiary FRUs. In other words, the method of acquiring and consolidating FRU information described in the flowchart of FIG. 8 does not require a priori knowledge of the complete tree structure, but rather builds this up as the investigation proceeds (as shown by the succession of FIGS. 9A–9E). Consequently, if the FRU capabilities or structure of a particular subsidiary FRU such as blade 40 are altered, for example, by increasing the number of DIMM slots to 8, or by starting to treat the two network interface cards 512A, B as additional subsidiary FRUs in their own right, then the service processor will discover this from the relevant FRU information 710 read from the blade 40, and so can still generate the correct FRU hierarchy.

Note that there are various modifications that could be adopted in the flowchart of FIG. 8. For example, rather than sequentially stepping down to every subsidiary FRU at step 840, the service processor could in effect spawn multiple sub-processes to investigate one or more subsidiary FRUs in parallel. Thus arriving at step 840 for the system configuration of FIG. 6, the service processor may obtain FRU information 710 in parallel for each of the two SSCs 52A and 52B, each of the sixteen blades 40, and each of the two PSUs 51A and 51B. The processing paths for the individual blades 40 would then split to investigate the disk drive unit 515 and four DIMM slots 540 in parallel.

In other embodiments, it may be that only part of the above processing is performed in parallel, the rest being kept serial. For example, one possibility is that multiple instances of the same FRU type are handled in parallel (i.e. PSUs 51A and 51B are investigated in parallel, likewise for the different blades 40), but subsidiary FRUs of different types are handled one after another (i.e. blades 40 are not investigated until PSUs 51A and 51B have completed).

The approach of FIG. 8 is generally overseen by a configuration utility or similar form of application running on the service processor 360. This obtains the FRU subsidiary data for the top node at step 810, and is responsible for determining from this whether the node has any lower levels at step 820. If this is indeed the case, the service processor is responsible for identifying the FRU ID 727 for the node to descend to at step 840, and sends this a request in order to obtain the FRU data at step 850. The service processor is likewise responsible for then determining whether it has obtained all the subsidiary FRU data for the level in question at step 830, and if so whether it is at the top of the FRU hierarchy at step 860.

In performing this investigation, the service processor application generally builds a FRU tree corresponding to that illustrated in FIGS. 9A–F. It will be appreciated that there are a variety of ways in which the acquired data can be structured. Typically, the service processor will utilise a tree or hierarchical database structure to represent and store the FRU hierarchy.

The procedure illustrated in FIG. 8 can be regarded as something of a top-down approach, in that it is driven by the service processor contacting each FRU in turn to obtain its FRU data 710. In other embodiments however, a somewhat more distributed technique may be adopted, such as illustrated in FIG. 10.

The processing of FIG. 10 is again typically initiated (from start 900) by a request from the service processor or other appropriate controller to obtain the consolidated FRU information (step 910). This request is received by the top node in the hierarchy (i.e. chassis 15 in the configuration of FIG. 6). This node then determines if it has any lower levels (step 920), based on its own subsidiary FRU data 725. If so, the node sends a request (step 940) for the FRU information to each of its potential subsidiary FRUs. Note that this can be regarded as forwarding the request received at step 910 down to the next lower level of the hierarchy.

In response to this request, the node will then receive the FRU data 710 from the lower levels at step 950. As previously discussed, only a certain portion of this data may be required, depending on the particular reason for generating the FRU tree structure. The request at step 940 may therefore specify only selected portions of FRU data 710 to be returned (e.g. FRU identity block 721 and subsidiary FRU information 725), or alternatively it may receive the complete FRU data 710, and then discard the portions that are not required. Note also that if a potential FRU is not present (e.g. a slot is currently vacant), then a null response may be received from that subsidiary FRU, or no response at all. This is then interpreted as representing the absence of a subsidiary FRU at that particular location.

Figure 10:
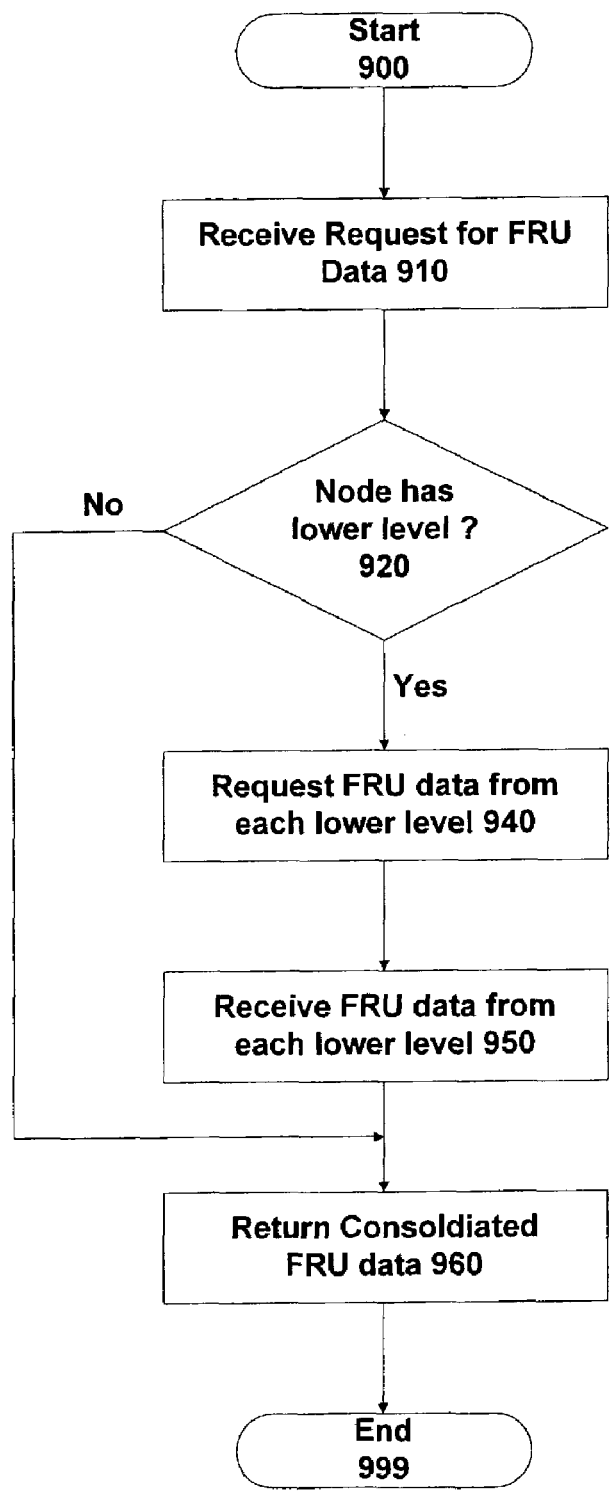
FIG. 10 is a flowchart showing how the FRU information from various FRUs is collated in accordance with another embodiment of the invention.

As depicted in FIG. 10, the request at step 940 is sent in parallel to each subsidiary FRU. However, in another embodiment, this could be done serially, in other words, send a request to one subsidiary FRU at step 940, receive a response at step 950, send a request to the next subsidiary FRU, and so on until a response has been received from all subsidiary FRUs. It is also possible to send only some of the requests in parallel, for example to all FRUs of a given type (similar to the variation discussed above in relation to FIG. 8).

Once the node has received the FRU data from each of its subsidiary FRUs, or alternatively if it does not have any subsidiary FRUs (i.e. the negative outcome from step 920), it returns a consolidated version of the subsidiary FRU data that it has received (step 960) to the transmitter of the initial request 910, whereupon processing terminates (End 999).

The procedure of the flowchart of FIG. 10 is performed separately for each node in the hierarchy. Thus taking the configuration of FIG. 6 as an example again, the chassis 15 receives an initial request from the service processor for consolidated FRU data (step 910). Since the chassis 15 has lower levels (i.e. potential subsidiary FRUs), it forwards the request at step 940 to each of these subsidiary FRUs, namely PSUs 51, blades 40 and SSCs 52. The processing at the chassis 15 will then in effect suspend as it waits to receive the FRU data 710 back from these lower levels.

The request sent by the chassis at step 940 is received by the SSCs 52, blades 40, and PSUs 51. For these subsidiary FRUs, this represents the receipt of a request for FRU data as per step 910, and so initiates the processing of FIG. 9 within these subsidiary FRUs. For PSU 51 and SSC 52 this processing is straightforward, in that these do not have any subsidiary FRUs, and so the test at step 920 is negative. Thus for PSU and SSC 52, the procedure simply returns their own FRU data 710 at step 960, and processing at PSU 51 and SSC 52 then terminates (End 999).

For blade 40 however, the test of step 920 is positive. Accordingly, blade 40 in turn forwards the request for FRU data to its subsidiary FRUs at step 940, i.e. to disk unit 515 and to RAM 540, and then waits to receive their responses. The request from blade 40 then initiates the processing of FIG. 10 within disk unit 515 and RAM 540, with the receipt of the request for FRU data from blade 40 corresponding to step 910. Since neither RAM 540 nor disk unit 515 has subsidiary FRUs, they each take the negative output at step 920, and proceed to return their FRU data 710 at step 960 to the blade 40. At this point, processing within RAM 540 and disk unit 515 terminates (End 999).

The blade 40 now receives the FRU data 710 from RAM 540 and disk unit 515 at step 950 (within the processing for blade 40). It then returns its consolidated FRU data 710 to chassis 15 (step 960). Note that this consolidated FRU data 710 comprises not only the FRU data 710 stored within blade 40 itself, but also the FRU data 710 just received at step 950 from its subsidiary FRUs (i.e. disk unit 515 and RAM 40). The processing at blade 40 now terminates (End 999).

Returning to the top of the hierarchy, chassis 15 now receives the consolidated FRU 710 data from blades 40, and well as the FRU data 710 from PSUs 51 and SSCs 52. This represents the complete set of FRU data for the system 10, which can then be returned to the service processor (step 960) in response to the original request. Processing at the chassis then concludes (End 999).

It will be appreciated that the choice of whether to adopt the method of FIG. 8 or FIG. 10 will depend on the details of the particular system in question. For example, the approach of FIG. 8 requires some form of centralised control, such as provided by the service processor, in order to acquire and consolidate the FRU information. In addition, there should be some form of route for the service processor to interrogate all the various lower levels of the FRU hierarchy. In contrast, the approach of FIG. 10 generally requires more distributed processing capability in the various FRUs, although this may not always be available. For example, for cost reasons it may be desirable to use off-the-shelf components (e.g. perhaps DIMMs 540) that do not necessarily contain support for the approach of FIG. 10.

It should be appreciated that a given system may adopt the approach of FIG. 8 in one part of the FRU hierarchy, and that of FIG. 10 in another part of the FRU hierarchy. For example, the top levels of the hierarchy could be derived under the control of the service processor, while the lower levels of at least some branches could be derived using the procedure of FIG. 10.

The acquisition of FRU information, such as by using the method of FIG. 8 or FIG. 10 (or a combination thereof) may be triggered by various circumstances. For example, a user may run a configuration or set-up utility program on the service processor, perhaps for inventory management or for diagnostic purposes. Alternatively, the system 10 may itself automatically launch the collection of the FRU information, perhaps on a periodic basis, or in response to a particular error. Another possibility is that FRU tree is built in response to the addition or removal of a FRU to/from the system (either upon request by the user, or because the system automatically detects such a change). Note that if it is known that the change has occurred in a particular branch of the FRU hierarchy, then it may be that only the FRU data for this branch of the tree is collected or updated, since it is assumed that a previously generated FRU tree for the system remains valid elsewhere (i.e. only the portion of the FRU tree that has changed is updated).

Note also that as illustrated in FIG. 7, some FRUs may maintain subsidiary FRU data 735 on a dynamic basis. Thus FRU data 735 may simply describe the next level down of installed FRUs (i.e. those FRUs installed directly into the current device), or may perhaps detail that whole branch of the FRU tree. The dynamic FRU subsidiary data 735 is typically recorded by a FRU on its own initiative, for example in response to the insertion or removal of a subsidiary FRU. However, it may be generated in response to a request from the service processor, or for any other desired reason (e.g. a user request). The dynamic FRU subsidiary data 735 stored within the various FRUs can be useful in allowing the dynamic FRU tree to be built more quickly on request. In addition, it can represent useful information specific to that FRU. For example, if the FRU develops a fault and has to be replaced, then in subsequent analysis it may be beneficial to have at least some knowledge of the subsidiary FRUs that were installed with that FRU (since these may or may not be removed with it).

While it is naturally desirable for the collected FRU information to be as complete as possible, it will be appreciated that sometimes there may be limitations on what can be obtained. These can arise for example where off-the-shelf components are used in system 10 to reduce costs, and such components lack support (either partly or entirely) for the above FRU information procedures. As a result, the FRU tree constructed by the service processor may be incomplete. For example, if the SSCs do not support FRU data acquisition, the final FRU tree would correspond to that shown in FIG. 9D. From this diagram, it is not known for certain whether there is an SSC currently installed in the chassis 15, and no information is available about any subsidiary FRUs that might be incorporated within SSC 52.

In fact, a more likely situation is that it is possible to discern whether or not a particular FRU is installed, and perhaps its part identity as well. This is because the presence of most devices can be detected as part of the general installation procedure. However, such a FRU will not then provide any information regarding any subsidiary FRUs that it might support or include.

Nevertheless, it will be recognised that even a partial FRU tree, such as shown in FIG. 9D, contains much useful data about the FRU hierarchy of system 10. Furthermore, it is possible to specifically identify from FIG. 9D where data is missing. In other words, if the derived FRU tree is incomplete at all, this will always be apparent to a user. This then allows the user to make additional enquiries if so desired. For example, a visual inspection of system 10 might be made to see if any SSCs 52 were in fact installed.

Various other modifications may also have to be made in view of cost or other design considerations. For example, if chassis 15 is a purely mechanical device, then it may not be able to store information about its subsidiary FRUs. Rather, this information could then potentially be stored in the service processor 360 (either entered at manufacture, or possibly at a subsequent configuration stage). Likewise, a particular device, such as RAM 540, may contain information about itself, but not necessarily in the standard format for FRU data as used by the rest of the system 10. In these circumstances, on insertion of the RAM 540 into a blade 40, the relevant information may be copied from the RAM into the blade 40 itself. Alternatively, the blade 40 may be able to generate on its own initiative certain FRU data about RAM 540, perhaps based on various testing that may already be part of an automatic configuration processing (such as determining the size of the RAM, and so on). The FRU data obtained in this was (i.e. by testing the RAM 540 and/or by reading various data from inside it) may then be stored with the FRU data 710 for the blade itself (in the dynamic portion 730), or else in some other convenient location. This would then allow future requests for FRU data from the RAM 540 to be satisfied directly by the blade 40, rather than from the RAM itself. (This FRU data would of course need updating, should the RAM be reconfigured).

In conclusion, although the approach described herein is typically intended for use in a computer system, it is applicable to any electronic system that has one or more FRUs. It will be appreciated that this includes a wide variety of computing systems (mainframe, server, workstation, desktop, laptop, handheld, etc.), plus a great range of electronic systems (e.g. telecommunications apparatus, household electronic devices such as televisions and DVD players, subsystems for transport devices such as cars and aeroplanes, and so on).

Thus while a variety of particular embodiments have been described in detail herein, it will be appreciated that this is by way of exemplification only. The skilled person will be aware of many further potential modifications and adaptations that fall within the scope of the claimed invention and its equivalents.

What is claimed is:

1. Apparatus including:
   a hierarchy of field replaceable units (FRUs), wherein a FRU in said hierarchy may have a number of subsidiary FRUs, and wherein each of said subsidiary FRUs has a type;
   wherein a FRU has stored FRU identity data, relating to the FRU itself, and subsidiary FRU data indicative of at least the number and type of any subsidiary FRUs that may be immediately below said FRU in the hierarchy;
   and wherein said apparatus is operable to provide a consolidated version of the FRU identity data and subsidiary FRU data stored in the hierarchy.

2. The apparatus of claim 1, wherein said subsidiary FRU data are stored into a FRU at manufacture.

3. The apparatus of claim 2, wherein said subsidiary FRU data lists the maximum number of each type of FRU that may be located immediately below said FRU in the hierarchy.

4. The apparatus of claim 3, wherein, for each type of slot or interface included in the FRU that can receive a subsidiary FRU, said subsidiary FRU data lists the number of slots or interfaces of that type.

5. The apparatus of claim 2, wherein said FRU identity data and subsidiary FRU data are stored in a read only memory (ROM).

6. The apparatus of claim 1, wherein a FRU supplies its stored FRU identity data and subsidiary FRU data in response to a request.

7. The apparatus of claim 6, wherein said apparatus includes a utility to generate the consolidated version of the FRU identity data and subsidiary FRU data stored in the hierarchy, and wherein said request is sent to the FRU by the utility.

8. The apparatus of claim 1, wherein a subsidiary FRU supplies its stored FRU identity data and subsidiary FRU data to a first FRU immediately above the subsidiary FRU in the hierarchy in response to a request.

9. The apparatus of claim 8, wherein said request is received from said first FRU.

10. The apparatus of claim 8, wherein the first FRU consolidates the supplied FRU identity data and subsidiary FRU data from all subsidiary FRUs of the first FRU with its own FRU identity data and subsidiary FRU data.

11. The apparatus of claim 10, wherein said apparatus includes a utility to generate the consolidated version of the FRU identity data and subsidiary FRU data stored in the hierarchy, and wherein the first FRU supplies its consolidated FRU data to the utility.

12. The apparatus of claim 10, wherein the first FRU supplies its consolidated FRU data to a FRU immediately above said first FRU in the hierarchy.

13. The apparatus of claim 10, wherein the first FRU stores its consolidated FRU data.

14. The apparatus of claim 1, wherein the subsidiary FRU data for a FRU is updateable to indicate the number and type of any subsidiary FRUs that are installed immediately below said FRU in the hierarchy in a current configuration of the apparatus.

15. The apparatus of claim 1, wherein said apparatus includes a utility to generate the consolidated version of the FRU identity data and subsidiary FRU data stored in the hierarchy, and wherein said utility represents a configuration or set-up program running on a service processor of the apparatus.

16. The apparatus of claim 1, wherein a new consolidated version of the FRU identity data and subsidiary FRU data stored in the hierarchy is generated in response to a change in configuration of the apparatus.

17. The apparatus of claim 1, wherein said apparatus includes an external interface from which the consolidated version of the FRU identity data and subsidiary FRU data stored in the hierarchy can be accessed.

18. A field replaceable unit (FRU) for installation into an apparatus comprising a hierarchy of FRUs, wherein a FRU in said hierarchy may have a number of subsidiary FRUs, and wherein each of said subsidiary FRUs has a type, said FRU having stored FRU identity data relating to the FRU itself, and subsidiary FRU data, indicative of at least the number and type of any subsidiary FRUs that are installable immediately below said FRU in the hierarchy.

19. The FRU of claim 18, wherein said FRU identity data and subsidiary FRU data are stored into the FRU at manufacture.

20. The FRU of claim 18, wherein, for each type of slot or interface included in the FRU that can receive a subsidiary FRU, said subsidiary FRU data lists the number of slots or interfaces of that type.

21. The FRU of claim 19, wherein said FRU identity data and subsidiary FRU data are stored in a read only memory (ROM).

22. The FRU of claim 18, wherein the FRU is operable to supply its stored FRU identity data and subsidiary FRU data in response to a request.

23. The FRU of claim 18, wherein the FRU is operable to generate consolidated FRU identity data and subsidiary FRU data from the set of subsidiary FRUs that are installed into the FRU by sending requests to said set of subsidiary FRUs and by receiving back their FRU identity data and subsidiary FRU data in response to said request.

24. The FRU of claim 23, wherein the FRU is operable to store its consolidated FRU data in conjunction with its own stored FRU identity data and subsidiary FRU data.

25. The FRU of claim 18, wherein the subsidiary FRU data is updateable to indicate the number and type of any subsidiary FRUs that are installed immediately below said FRU in the hierarchy in a current configuration of the apparatus.

26. A method of manufacturing a field replaceable unit (FRU) for installation into an apparatus comprising a hierarchy of FRUs, wherein a FRU in said hierarchy may have a number of subsidiary FRUs, and wherein each of said subsidiary FRUs has a type, said method comprising:
  generating subsidiary FRU data indicative of at least the number and type of any subsidiary FRUs that are installable immediately below said FRU in said hierarchy; and
  storing the subsidiary FRU data into a read only memory (ROM) within the FRU.

27. A method of operating apparatus including a hierarchy of field replaceable units (FRUs), wherein a FRU in said hierarchy may have a number of subsidiary FRUs, and wherein each of said subsidiary FRUs has a type, said method comprising:
  providing, within a FRU, FRU identity data relating to the FRU itself, and subsidiary FRU data indicative of at least the number and type of any subsidiary FRUs that may be immediately below said FRU in the hierarchy; and
  generating a consolidated version of the FRU identity data and subsidiary FRU data stored in the hierarchy.

28. The method of claim 27, wherein said FRU identity data and subsidiary FRU data are stored into a FRU at manufacture.

29. The method of claim 27, wherein said subsidiary FRU data lists the maximum number of each type of FRU that may be located immediately below said FRU in the hierarchy.

30. The method of claim 29, wherein, for each type of slot or interface included in the FRU that can receive a subsidiary FRU, said subsidiary FRU data lists the number of slots or interfaces of that type.

31. The method of claim 27, further comprising a FRU supplying its stored FRU identity data and subsidiary FRU data to a utility in response to a request, wherein said utility is responsible for generating the consolidated version of the FRU identity data and subsidiary FRU data stored in the hierarchy.

32. The method of claim 31, further comprising said utility transmitting said request to said FRU, whereupon the FRU supplies its stored FRU identity data and subsidiary FRU data to the utility in response to said request.

33. The method of claim 27, further comprising a subsidiary FRU supplying its stored FRU identity data and subsidiary FRU data to a first FRU immediately above the subsidiary FRU in the hierarchy in response to a request.

34. The method of claim 33, wherein said request is received from said first FRU.

35. The method of claim 33, further comprising consolidating at the first FRU the supplied FRU identity data and subsidiary FRU data from all subsidiary FRUs of the first FRU, together with the FRU identity data and subsidiary FRU data for the first FRU.

36. The method of claim 35, further comprising the first FRU supplying its consolidated FRU data to a utility, wherein said utility is responsible for generating the consolidated version of the FRU identity data and subsidiary FRU data stored in the hierarchy.

37. The method of claim 35, further comprising the first FRU supplying its consolidated FRU data to a FRU immediately above said first FRU in the hierarchy.

38. The method of claim 35, further comprising the first FRU storing its consolidated FRU data in said first FRU.

39. The method of claim 27, further comprising updating the subsidiary FRU data for a FRU to indicate the number and type of any subsidiary FRUs that are installed immediately below said FRU in the hierarchy in a current configuration of the apparatus.

40. The method of claim 27, further comprising generating a new consolidated version of the FRU identity data and subsidiary FRU data stored in the hierarchy in response to a change in configuration of the apparatus.

41. The method of claim 27, further comprising providing an external interface from which the consolidated version of the FRU identity data and subsidiary FRU data stored in the hierarchy can be accessed.

42. A computer program product comprising program instructions in machine readable form on a media for loading into apparatus including a hierarchy of field replaceable units (FRUs), wherein a FRU in said hierarchy may have a number of subsidiary FRUs, and wherein each of said subsidiary FRUs has a type, and wherein a FRU has stored FRU identity data, relating to the FRU itself, and subsidiary FRU data indicative of at least the number and type of any subsidiary FRUs that may be immediately below said FRU in the hierarchy, said instructions causing the following method to be performed, for each level of the hierarchy:

(a) transmitting a request for the FRU identity data and the subsidiary FRU data to each FRU in that level of the hierarchy;

(b) receiving FRU identity data and subsidiary FRU data from each FRU in that level in response to said request; and (c) determining from the received subsidiary data the existence of any subsidiary FRUs in the next lower level of the hierarchy;

wherein steps (a)–(c) are iteratively repeated until all the FRU identity data and subsidiary FRU data stored in the hierarchy have been received; and generating a consolidated version of the received FRU identity data and subsidiary FRU data.

43. The computer program product of claim 42, wherein subsidiary FRU data for a FRU lists the maximum number of each type of FRU that may be located immediately below the FRU in the hierarchy.

44. The computer program product of claim 42, wherein subsidiary FRU data for a FRU is updateable to indicate the number and type of any subsidiary FRUs that are installed immediately below said FRU in the hierarchy in a current configuration of the apparatus.

45. The computer program product of claim 42, wherein said program instructions comprise a configuration or set-up utility program which is run on a service processor of the apparatus.

46. The computer program product of claim 45, wherein said utility program generates a new consolidated version of the FRU identity data and subsidiary FRU data stored in the hierarchy in response to a change in configuration of the apparatus.

47. Apparatus including a hierarchy of field replaceable units (FRUs), wherein a FRU in said hierarchy may have a number of subsidiary FRUs, and wherein each of said subsidiary FRUs has a type, said apparatus comprising:

means for providing, within a FRU, FRU identity data relating to the FRU itself, and subsidiary FRU data indicative of at least the number and type of any subsidiary FRUs that may be immediately below said FRU in the hierarchy; and means for generating a consolidated version of the FRU identity data and subsidiary FRU data stored in the hierarchy.

* * * * *